（12）United States Patent
Pawar et al.

(10) Patent No.: US 12,502,274 B2
(45) Date of Patent: Dec. 23, 2025

(54) TEXTILES AND IMPLANTABLE MEDICAL DEVICES USING THE SAME

(71) Applicant: Edwards Lifesciences Corporation, Irvine, CA (US)

(72) Inventors: Sandip Vasant Pawar, Irvine, CA (US); Arpit Laddha, Santa Ana, CA (US); Chambory Chhe, Santa Ana, CA (US)

(73) Assignee: Edwards Lifesciences Corporation, Irvine, CA (US)

( * ) Notice: Subject to any disclaimer, the term of this patent is extended or adjusted under 35 U.S.C. 154(b) by 739 days.

(21) Appl. No.: 17/932,940

(22) Filed: Sep. 16, 2022

(65) Prior Publication Data
US 2023/0009615 A1 Jan. 12, 2023

Related U.S. Application Data

(63) Continuation of application No. PCT/US2021/022293, filed on Mar. 15, 2021.

(60) Provisional application No. 62/991,447, filed on Mar. 18, 2020.

(51) Int. Cl.
A61F 2/24 (2006.01)
D03D 1/00 (2006.01)
D03D 13/00 (2006.01)
D03D 15/49 (2021.01)
D03D 15/567 (2021.01)

(52) U.S. Cl.
CPC .......... A61F 2/2418 (2013.01); A61F 2/2415 (2013.01); D03D 1/00 (2013.01); D03D 13/004 (2013.01); D03D 15/49 (2021.01); D03D 15/567 (2021.01); A61F 2210/0014 (2013.01); A61F 2250/0036 (2013.01); A61F 2250/0037 (2013.01); D10B 2507/00 (2013.01)

(58) Field of Classification Search
CPC ........ D03D 15/49; D03D 15/567; D03D 1/00; D03D 13/004
See application file for complete search history.

(56) References Cited

U.S. PATENT DOCUMENTS

| 4,035,849 | A | 7/1977 | Angell et al. |
| 5,411,552 | A | 5/1995 | Andersen et al. |
| 5,554,185 | A | 9/1996 | Block et al. |
| 5,840,081 | A | 11/1998 | Andersen et al. |
| 6,168,614 | B1 | 1/2001 | Andersen et al. |
| 6,458,153 | B1 | 10/2002 | Bailey et al. |
| 6,582,462 | B1 | 6/2003 | Andersen et al. |

(Continued)

FOREIGN PATENT DOCUMENTS

| CN | 104786564 A | 7/2015 |
| DE | 19532846 A1 | 3/1997 |

(Continued)

Primary Examiner — Suba Ganesan
(74) Attorney, Agent, or Firm — Meunier Carlin & Curfman

(57) ABSTRACT

A 3-D honeycomb textile can include a textured yarn. The textile can exhibit a heat-shrinkage rate from about 10% to about 60%. The textile can be configured to reversibly change its dimensions under application of stress. Prosthetic valves can have the disclosed textiles as a sealing member. Additionally, prosthetic valves can the disclosed textiles as cushion materials. In addition, methods of making the disclosed textiles and prosthetic valves are described.

20 Claims, 10 Drawing Sheets

(56) References Cited

U.S. PATENT DOCUMENTS

| | | |
|---|---|---|
| 6,652,578 B2 | 11/2003 | Bailey et al. |
| 6,689,162 B1 | 2/2004 | Thompson |
| 7,018,408 B2 | 3/2006 | Bailey et al. |
| 7,618,446 B2 | 11/2009 | Andersen et al. |
| 7,785,366 B2 | 8/2010 | Maurer et al. |
| 8,449,606 B2 | 5/2013 | Eliasen et al. |
| 8,940,041 B2 | 1/2015 | Carlson et al. |
| 2004/0215320 A1 | 10/2004 | Machek |
| 2005/0096736 A1 | 5/2005 | Osse et al. |
| 2005/0203614 A1 | 9/2005 | Forster et al. |
| 2005/0203617 A1 | 9/2005 | Forster et al. |
| 2005/0287343 A1* | 12/2005 | Weiser ................ D03D 13/004 428/397 |
| 2006/0025857 A1 | 2/2006 | Bergheim et al. |
| 2006/0089672 A1 | 4/2006 | Martinek |
| 2007/0203575 A1 | 8/2007 | Forster et al. |
| 2007/0265700 A1 | 11/2007 | Eliasen et al. |
| 2008/0125853 A1 | 5/2008 | Bailey et al. |
| 2012/0116492 A1 | 5/2012 | Seibold et al. |
| 2013/0273795 A1 | 10/2013 | Richter |
| 2015/0127088 A1 | 5/2015 | Carlson et al. |
| 2015/0190552 A1 | 7/2015 | Richter |
| 2015/0230953 A1 | 8/2015 | Bar et al. |
| 2017/0252156 A1* | 9/2017 | Bernstein ................ A61F 2/06 |

FOREIGN PATENT DOCUMENTS

| | | |
|---|---|---|
| DE | 19907646 A1 | 8/2000 |
| EP | 0592410 B1 | 10/1995 |
| WO | 9117720 A1 | 11/1991 |
| WO | 0149213 A2 | 7/2001 |
| WO | 0247575 A2 | 6/2002 |
| WO | 2005084595 A1 | 9/2005 |
| WO | 2005102015 A2 | 11/2005 |
| WO | 2007067942 A1 | 6/2007 |
| WO | 2010121076 A2 | 10/2010 |

* cited by examiner

TEXTILES AND IMPLANTABLE MEDICAL DEVICES USING THE SAME

CROSS-REFERENCE TO RELATED APPLICATIONS

This application is a continuation of PCT application no. PCT/US2021/022293 filed on Mar. 15, 2021, which application claims the benefit of U.S. Provisional Application No. 62/991,447, filed Mar. 18, 2020, entitled Textiles and Implantable Medical Devices Using the Same, the content of each of these applications being incorporated herein by reference in its entirety.

FIELD

The present application concerns aspects of textile materials made from a textured yarn, where at least a portion of the textile material has a 3-D honeycomb pattern having a plurality of cell units. The present application also concerns aspects of implantable medical devices comprising such textile materials.

BACKGROUND

The heart can suffer from various valvular diseases or malformations that result in significant malfunctioning of the heart and ultimately require replacement of the native heart valve with an artificial valve. Human heart valves, which include the aortic, pulmonary, mitral, and tricuspid valves, function essentially as one-way valves operating in synchronization with the pumping heart. The valves allow blood to flow downstream but block blood from flowing upstream. Diseased heart valves exhibit impairments such as narrowing of the valve or regurgitation, which inhibits the valves' ability to control blood flow. Such impairments reduce the heart's blood-pumping efficiency and can be a debilitating and life-threatening condition. For example, valve insufficiency can lead to conditions such as heart hypertrophy and dilation of the ventricle. Thus, extensive efforts have been made to develop methods and apparatuses to repair or replace impaired heart valves.

Prostheses exist to correct problems associated with impaired heart valves. For example, mechanical and tissue-based heart valve prostheses can be used to replace impaired native heart valves. More recently, substantial effort has been dedicated to developing replacement heart valves, particularly tissue-based replacement heart valves that can be delivered with less trauma to the patient than through open-heart surgery. Replacement valves are being designed to be delivered through minimally invasive procedures and even percutaneous procedures. Such replacement valves often include a tissue-based valve body that is connected to an expandable frame that is then delivered to the native valve's annulus.

These replacement valves are often intended to at least partially block blood flow. However, a problem occurs when blood flows around the valve on the outside of the prosthesis. For example, in the context of replacement heart valves, paravalvular leakage has proven particularly challenging. An additional challenge relates to the ability of such prostheses to be secured relative to intra-luminal tissue, e.g., tissue within any body lumen or cavity, in an atraumatic manner. Further challenges arise when trying to controllably deliver and secure such prostheses in a location such as at a native mitral valve. These replacement valves are often intended to at least partially block blood flow.

Because of the drawbacks associated with conventional open-heart surgery, percutaneous and minimally-invasive surgical approaches are garnering intense attention. In one technique, a prosthetic valve is configured to be implanted in a much less invasive procedure by way of catheterization. For instance, U.S. Pat. Nos. 5,411,522 and 6,730,118, which are incorporated herein by reference, describe collapsible transcatheter heart valves that can be percutaneously introduced in a compressed state on a catheter and expanded in the desired position by balloon inflation or by utilization of a self-expanding frame or stent. In yet another example, U.S. U.S. Publication Nos. 2014/0277390, 2014/0277422, 2014/0277427, and 2015/0328000, and 2019/0328515, which are incorporated herein by reference in their entirety, describe heart valve prostheses for replacing a native mitral valve including a self-expanding frame with a plurality of anchoring members that are designed be deployed within a body cavity and prevent axial flow of fluid around an exterior of the prosthesis.

However, problems still can occur. For example, in the context of replacement heart valves, paravalvular leakage has proven particularly challenging.

An additional challenge relates to the ability of such prostheses to be secured relative to intra-luminal tissue, e.g., tissue within any body lumen or cavity, in an atraumatic manner. Further challenges arise when trying to controllably deliver and secure such prostheses in a location such as at a native mitral valve.

These needs and others are at least partially satisfied by the present disclosure.

SUMMARY

Some aspects of the present disclosure relate to textiles. Some aspects relate to a textile defined by a first surface and an opposite second surface and having a longitudinal axis and a transverse axis, and having a first thickness, a first width, and a first length, and comprising: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversibly arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response.

Yet, further disclosed herein is an aspect, wherein the plurality of warp yarns and the plurality of weft yarns, as described in any one of the preceding aspects, comprise the textured yarn. Still further, disclosed herein is an aspect, wherein the textured yarn present in the textile, as described in any one of the preceding aspects, is selected from a friction-textured yarn, a pin textured yarn, an air textured yarn, a belt textured yarn, a stuffer box textured yarn, or any combination thereof.

Also disclosed herein are aspects comprising a tissue scaffold material comprising the textile, as described in any one of the preceding aspects.

Yet another aspect described herein, relates to an implantable medical device comprising: an annular frame having an inflow end, an outflow end, and a longitudinal axis; and a sealing element secured to the frame, wherein the sealing element comprises: textile defined by a first surface and an opposite second surface and having a longitudinal axis and a transverse axis and having a first thickness, a first width, and a first length, and comprising: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversibly arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response; and wherein the implantable medical device is configured to radially collapse to a collapsed configuration and radially expand to an expanded configuration.

Still, further, the aspects disclosed herein relate to an implantable medical device comprising: a self-expanding frame having an upper region, an intermediate region and a lower region, wherein the frame is configured to radially expand and contract for deployment within a body cavity, and wherein the self-expanding frame comprises a plurality of anchoring members disposed along the lower region; wherein at least a portion of at least some of the plurality of anchoring members is enclosed within a textile material, wherein the textile material is defined by a first surface and an opposite second surface, having a longitudinal axis and a transverse axis, and having a first thickness, a first width, and a first lengths, and comprising: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile exhibits a first stress-relaxation response; and wherein the textile material is biocompatible and behaves as a cushion, and exhibits compressibility of 50-95% of the first thickness under a loading force of from about 45 to about 56 lbs.

Also disclosed herein are methods comprising weaving a plurality of weft yarns and a plurality of warp yarns to form a textile, wherein the formed textile is defined by a first surface and an opposite second surface and having a longitudinal axis and a transverse axis, and having a first thickness, a first width, and a first lengths and wherein at least a portion of the first surface and/or the second surface has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversible arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response.

Yet further aspects relate to methods of making an implantable medical device comprising: providing a sealing element comprising a textile material defined by a first surface and an opposite second surface and having a longitudinal axis and a transverse axis, and having a first thickness, a first width, and a first length, and comprising: a plurality of weft yarns and a plurality of warp yarns arranged such that at least a portion of the first surface and/or the second surface of the textile has a 3-D honeycomb pattern having a plurality of repeating cell unit, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversible arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response; and securing the sealing element to an annular frame of the implantable medical device.

Also disclosed methods of making an implantable medical device comprising: providing a self-expanding frame having an upper region, an intermediate region and a lower region, wherein the frame is configured to radially expand and contract for deployment within a body cavity, and wherein the self-expanding frame comprises a plurality of anchoring members disposed along the lower region; enclosing at least a portion of at least some of the plurality of anchoring members within a textile material, wherein the textile material is defined by a first surface and an opposite second surface having a longitudinal axis and a transverse axis, and having a first thickness, a first width, and a first length and comprises: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile exhibits a first stress-relaxation response; and wherein the textile material is biocompatible and behaves as a cushion, and exhibits compressibility of 50-95% of the first thickness under a loading force of from about 45 to about 56 lbs. It is understood that in some aspects described herein, the step of enclosing can comprise forming one or more layers of the textile material around the at least a portion of at least some of the plurality of anchoring members.

Additional aspects of the disclosure will be set forth, in part, in the detailed description, figures, and claims which follow, and in part will be derived from the detailed description or can be learned by practice of the disclosure. It is to be understood that both the foregoing general description

DETAILED DESCRIPTION

Figure 1:
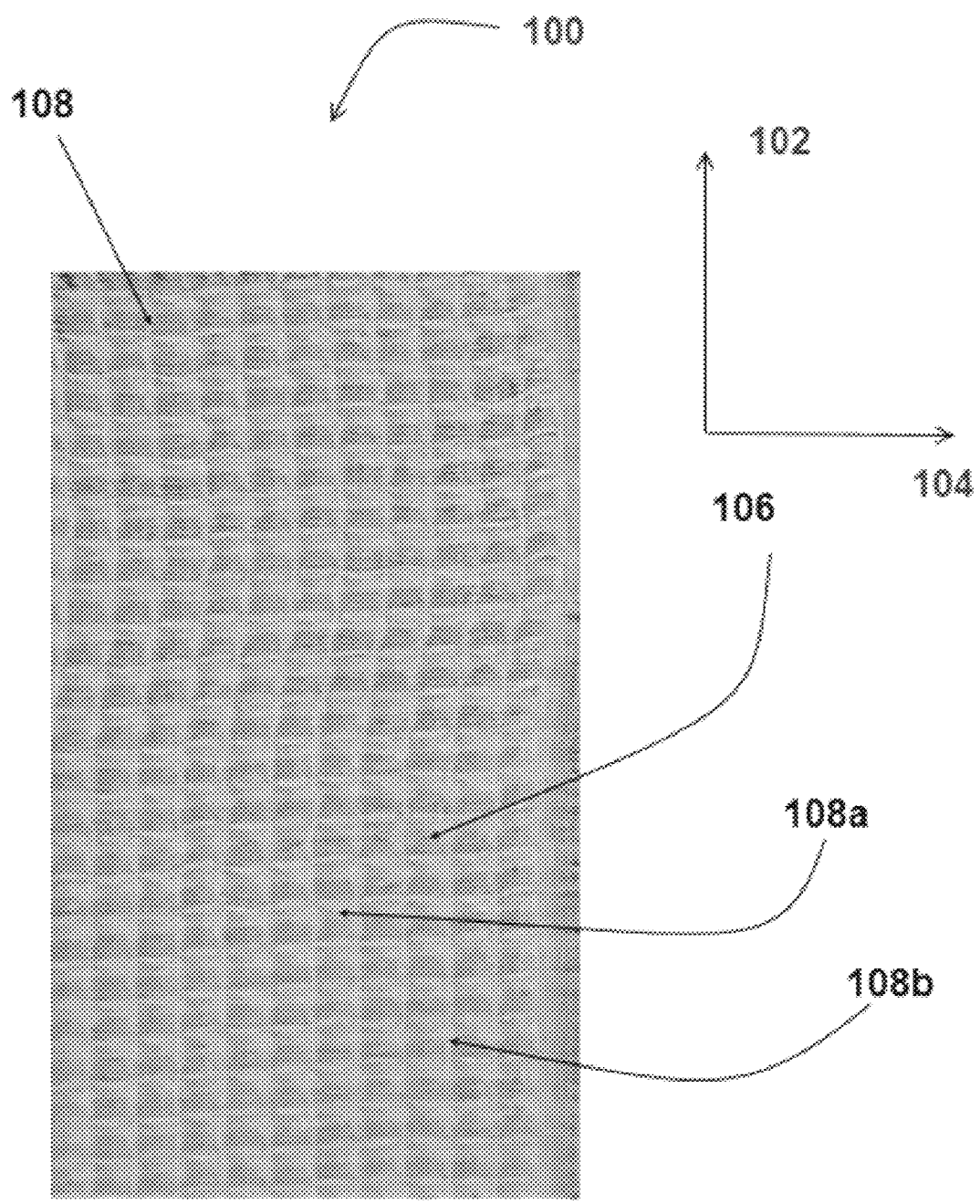
FIG. 1 shows an exemplary textile having a 3-D honeycomb pattern having a plurality of repeating cell units in unfinished form.

The present disclosure can be understood more readily by reference to the following detailed description, examples, drawings, and claims, and their previous and following description. However, before the present articles, systems, and/or methods are disclosed and described, it is to be understood that this disclosure is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its best, currently known aspect. To this end, those skilled in the relevant art will recognize and appreciate that many changes can be made to the various aspects of the disclosure described herein while still obtaining the beneficial results of the present disclosure. It will also be apparent that some of the desired benefits of the present disclosure can be obtained by selecting some of the features of the present disclosure without utilizing other features. Accordingly, those of ordinary skill in the pertinent art will recognize that many modifications and adaptations to the present disclosure are possible and may even be desirable in certain circumstances and are a part of the present disclosure. Thus, the following description is again provided as illustrative of the principles of the present disclosure and not in limitation thereof.

Definitions

As used in this application and in the claims, the singular forms "a," "an," and "the" include the plural forms unless the context clearly dictates otherwise. Thus, for example, reference to a "yarn" includes aspects having two or more such yarns unless the context clearly indicates otherwise.

It is also to be understood that the terminology used herein is for the purpose of describing particular aspects only and is not intended to be limiting. As used in the specification and in the claims, the term "comprising" can include the aspects "consisting of" and "consisting essentially of." Additionally, the term "includes" means "comprises."

For the terms "for example," "exemplary," and "such as," and grammatical equivalences thereof, the phrase "and without limitation" is understood to follow unless explicitly stated otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It should be further understood that the endpoints of each of the ranges are significant both in relation to the other endpoint, and independently of the other endpoint.

As used herein, the terms "optional" or "optionally" mean that the subsequently described event or circumstance may or may not occur and that the description includes instances where said event or circumstance occurs and instances where it does not.

Further, the terms "coupled" and "associated" generally mean electrically, electromagnetically, and/or physically (e.g., mechanically or chemically) coupled or linked and do not exclude the presence of intermediate elements between the coupled or associated items.

As used herein, the term "and/or" includes any and all combinations of one or more of the associated listed items. It is also understood that the term "and/or" includes where one or another of the associated listed items is present and the aspects where both of the associated listed items present, or any combinations of the associated listed items are present.

As used herein, the term or phrase "effective," "effective amount," or "conditions effective to" refers to such amount or condition that is capable of performing the function or property for which an effective amount or condition is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

The term "fiber" as used herein includes fibers of extreme or indefinite length (i.e., filaments) and fibers of short length (i.e., staple fibers).

As used herein, the term "polyester" refers to a category of polymers that contain the ester functional group in their main chain. Polyesters disclosed herein include naturally occurring chemicals, such as in the cutin of plant cuticles, as well as synthetics produced through step-growth polymerization. In certain examples, the polyesters comprise polyethylene terephthalate (PET) homopolymer and copolymers, polypropylene terephthalate (PPT) homopolymer and copolymers and polybutylene terephthalate (PBT) homopolymer and copolymers, and the like, including those that contain comonomers such as cyclohexane dimethanol, cyclohexane dicarboxylic acid, isophthalic acid, and the like.

The term "polyamide," as utilized herein, is defined to be any long-chain polymer in which the linking functional groups are amide (—CO—NH—) linkages. The term polyamide is further defined to include copolymers, terpolymers, and the like, as well as homopolymers and also includes blends of two or more polyamides. In some aspects, the plurality of polyamide fibers comprise one or more nylon 6, nylon 66, nylon 10, nylon 612, nylon 12, nylon 11, or any combination thereof. In other aspects, the plurality of polyamide fibers comprise nylon 6 or nylon 66. In yet other aspects, the plurality of polyamide fibers are nylon 6. In a yet further aspect, the plurality of polyamide fibers are nylon 66.

As defined herein, the term "polyolefin" refers to any class of polymers produced from a simple olefin (also called an alkene with the general formula $C_nH_{2n}$) as a monomer. In some aspects, the polyolefins include but are not limited to, polyethylene, polypropylene, both homopolymer and copolymers, poly(I-butene), poly(3-methyl-l-butene), poly(4-methyl-1-pentene) and the like, as well as combinations or mixtures of two or more of the foregoing.

As defined herein, the term "polyurethane" refers to any class of polymers composed of a chain of organic units joined by carbamate (urethane, $R_1$—O—CO—$NR_2$—$R_3$, wherein R1, R2 and R3 are the same or different) links.

As defined herein, the term "polyether" refers to any class of polymers composed of a chain of organic units joined by an ether group.

As defined herein, the term "polyurea" refers to any class of polymers where alternative monomer units of isocyanates and amines react with each other to form urea linkages.

Although the operations of exemplary aspects of the disclosed method may be described in a particular, sequential order for convenient presentation, it should be understood that disclosed aspects can encompass an order of operations other than the particular, sequential order disclosed. For example, operations described sequentially may, in some cases, be rearranged or performed concurrently. Further, descriptions and disclosures provided in association with one particular aspect are not limited to that aspect and may be applied to any aspect disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

Textile

Disclosed herein is a textile defined by a first surface and an opposite second surface and having a longitudinal axis and a transverse axis, and having a first thickness, a first width, and a first length, and comprising: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversible arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response.

In still further aspects, the first textile thickness can be from about 0.1 mm to about 10 mm, including exemplary values of about 0.2 mm, about 0.3 mm, about 0.4 mm, 0.5 mm, about 0.6 mm, about 0.7 mm, about 0.8 mm, about 0.9 mm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 8.5 mm, about 9 mm, and about 9.5 mm. In yet other aspects, the first textile thickness can have any values between any two foregoing values.

In still further aspects, when the first textile length is from about 1 mm to about 100 mm, including exemplary values of about 2 mm, about 5 mm, about 7 mm, about 10 mm, about 12, mm, about 15 mm, about 17 mm, about 20 mm, about 22 mm, about 25 mm, about 27 mm, about 30 mm, about 32, mm, about 35 mm, about 37 mm, about 40 mm, about 42 mm, about 45 mm, about 47 mm, about 50 mm, about 52, mm, about 55 mm, about 57 mm, about 60 mm, about 62 mm, about 65 mm, about 67 mm, about 70 mm, about 72, mm, about 75 mm, about 77 mm, about 80 mm, about 82 mm, about 85 mm, about 87 mm, about 90 mm, about 92, mm, about 95 mm, and about 97 mm. It is understood that these values are exemplary and not limiting and that textiles can have any length values between any two foregoing values. It is further understood that the first length can be about 150 mm, about 200 mm, or about 1 m if the specified application requires it.

In still further aspects, wherein the textile width is from about 1 mm to about 100 mm, including exemplary values of about 2 mm, about 5 mm, about 7 mm, about 10 mm, about 12, mm, about 15 mm, about 17 mm, about 20 mm, about 22 mm, about 25 mm, about 27 mm, about 30 mm, about 32, mm, about 35 mm, about 37 mm, about 40 mm, about 42 mm, about 45 mm, about 47 mm, about 50 mm, about 52, mm, about 55 mm, about 57 mm, about 60 mm, about 62 mm, about 65 mm, about 67 mm, about 70 mm, about 72, mm, about 75 mm, about 77 mm, about 80 mm, about 82 mm, about 85 mm, about 87 mm, about 90 mm, about 92, mm, about 95 mm, and about 97 mm. It is understood that these values are exemplary and not limiting and that textiles can have any width values between any two foregoing values. It is further understood that the first width can be about 150 mm, about 200 mm, or about 1 m if the specified application requires it It is understood that in the aspects of the current disclosure, when the comparison is made between the first and the second dimensions, the actual comparison is made between the first length in the relaxed position and the second length under the stress, or between the first width in the relaxed position and the second width under the stress, or between the first thickness in the relaxed position and the second thickness under the stress. It is further understood that the comparison is made between the first dimension and the second dimension in the same direction as the applied stress. For example, in the aspects where the stress is stretching applied along the longitudinal axis, the comparison is made between the first length along the longitudinal axis and the second length along the same stretch axis. In yet further aspects, where the stress is stretching applied along the transverse axis, the comparison is made between the first width along the transverse axis and the second width along the same stretch axis. In still further aspects, where the stress is compression applied across the first thickness of the textile, the comparison is made between the first thickness before application of the load and the second thickness obtained after the load has been applied.

In still further aspects, the stress can comprise stretching the textile. While in other aspects, the stress can comprise compression of the textile.

In the aspects where the stress comprises stretching the textile in one or more directions along the longitudinal, the transverse axis, or across of the textile, the second dimension selected from the second length or width is greater than 0 to about 300%, including exemplary values of about 1%, about 5%, about 10%, about 20%, about 30%, about 40%, about 50%, about 60%, about 70%, about 80%, about 90%, about 100%, about 120%, about 150%, about 170%, about 200%, about 220%, about 250%, and about 260 of the first dimension selected from the first length or width, as measured in the stretch direction. It is further understood that the textiles disclosed herein can have a different response to the same stress as measured along the textile width, length, or thickness. For example, when the textile is stressed by stretching, the first length of the textile can change from the relaxed position to the second length that is greater than 0% to about 300% of the first length. However, it is also understood that in certain aspects, if the textile, for example, is stressed by stretching along the first length or along the longitudinal axis, while the second length can be greater than 0% to about 300%, the second width can shrink to greater than 0% to about 300%, including exemplary values, of about 1%, about 5%, about 10%, about 20%, about 30%, about 40%, about 50%, about 60%, about 70%, about 80%, about 90%, about 100%, about 120%, about 150%, about 170%, about 200%, about 220%, about 250%, and about 260% of the first width. Similarly, in certain aspects, if the textile, for example, is stressed by stretching along the first length or along the longitudinal axis, while the second length can be greater than 0% to about 300%, the second thickness can decrease by greater than 0% to about 300%, including exemplary values of about 1%, about 5%, about 10%, about 20%, about 30%, about 40%, about 50%, about 60%, about 70%, about 80%, about 90%, about 100%, about 120%, about 150%, about 170%, about 200%, about 220%, about 250%, and about 260% of the first thickness. It is further understood that the % in an increase of the first length, for example, can be the same or different from the % of decrease of the first width or thickness. It is further understood that the changes in the length, width, and/or thickness can be dependent on the direction of the applied stress. For example, and without limitations, in some aspects, the textiles disclosed herein can have the second thickness of about 90-95% smaller than the first thickness when the textile is stretched by about 100-125% in all directions. However, yet in other aspects, the disclosed textile can become rigid and/or less compressible with apparent higher thickness if stretched in only one direction.

In still further aspects, the second dimension along each direction can be the same or different from the second dimension along the rest of the one or more directions. In some exemplary aspects, when for example, the stress comprises stretching the textile along its longitudinal axis, the second dimension defined by the second length can be the same or different when compared to the stretching the textile along its transverse axis or across the textile.

In still further aspects, wherein the stress comprises compression across the first thickness of the textile and wherein the textile exhibits compressibility of 50-95%, including exemplary values of about 55%, about 60%, about 65%, about 70%, about 75%, about 80%, about 85%, and about 90% of the first thickness under a loading force of about 45 to about 56 lbs, including exemplary values of about 46 lbs, about 47 lbs, about 48 lbs, about 49 lbs, about 50 lbs, about 51 lbs, about 52 lbs, about 53 lbs, about 54 lbs, and about 55 lbs. It is understood that the compressibility can be dependent on the first thickness of the textile. In still further aspects, it is understood that the compressibility can be measured as a function of the textile layers. In some aspects, the first thickness of the textile will be defined by a total thickness of each of the thicknesses of each textile layer.

In certain aspects, the at least a portion of the first surface and the second surface has the 3-D honeycomb pattern.

It is understood that the yarn path in honeycomb fabric can comprise interwoven curves and straight yarn floats. The length and altitude of yarn float, no matter whether in the warp or weft, are both increasing and then decreasing gradually and simultaneously. In such exemplary aspects, a periodicity and forming repeats of inverted pyramidal space can be formed on both surfaces of the fabric. Yet, in other aspects, the honeycomb design can be formed only on one surface of the fabric. In some exemplary aspects, in a honeycomb fabric, the part of a warp yarn underneath a weft float is a warp float. In still further aspects, two layers of floats can form a closed internal space. Without wishing to be bound by any theory, it is hypothesized that the periodical repeats of the inverted pyramidal space and the closed internal space in the honeycomb fabric can provide good sound and moisture absorption, good insulation, and a quick-dry rate. In general, the tensile strength of an interlaced plain-woven fabric is comparatively highest due to the interlacements of the yarns. However, without wishing to be bound by any theory, it is hypothesized that due to the existence of a yarn straight float, the mechanical properties, such as burst strength, compression, and shear of the textile can be improved when compared to an interlaced plain-woven fabric.

In still further aspects, the plurality of warp yarn and the plurality of weft yarns can comprise the textured yarn. It is understood that the textured yarn can be prepared by any known in the art methods. In certain aspects, the textured yarn can be selected from a friction-textured yarn, a pin textured yarn, an air textured yarn, a belt textured yarn, a stuffer box textured yarn, or any combination thereof. Still, in further exemplary and unlimiting aspects, the textured yarn can be produced by friction texturing, or pin or false twist texturing, air texturing, stuffer box texturing, or any combination thereof. In still further exemplary aspects, the textured yarn is a friction-textured yarn.

In still further aspects, the textured yarn can exhibit a heat-shrinkage rate from about 10% to about 60%, including exemplary values of about 15%, about 20%, about 25%, about 30%, about 35%, about 40%, about 45%, about 40%, about 45%, about 50%, and about 55%. It is understood that the textured yarn can have a heat-shrinkage rate value between any two foregoing values.

It is further understood that various textured yarns can have various degrees of texturizing. The degree of texturing is evaluated by measuring crimp contraction, stretch potential, and bulk ratio of the textured yarn. Without wishing to be bound by any theory, it is hypothesized that the degree of texturizing can have an impact on the shrinkage properties of the textile as well as the final bulkiness of the textile.

In some aspects and as disclosed herein, each yarn of the plurality of weft yarns and/or warp yarns can comprise a plurality of fibers. In still further aspects, the textured yarn can comprise polyesters, co-polyesters, ultra-high molecular weight polyethylene, polyethylene, polypropylene, polytetrafluoroethylene, expanded polytetrafluoroethylene, polyvinylidene fluoride, polyurethane, polyethers, polyureas, nylon, copolymers thereof, or a combination thereof. It is understood that the plurality of yarns present in the textile can comprise the same or different yarn. For example, in certain aspects, and without limitation, all yarns in the plurality of yarns are textured. In still further aspects, all textured yarns are the same. However, in other aspects, not all the yarns comprise the same textured yarn. In certain aspects, the yarns can be different by a type of material or a type of texturing method. Similarly, the plurality of yarns in the weft and warp direction can be the same or different.

In still further aspects, each yarn of the plurality of weft yarns and/or warp textured yarns can have a size from about 10 to about 200 denier, including exemplary values of about 20 denier, about 50 denier, about 70 denier, about 100 denier, about 120 denier, about 150 denier, and about 170 denier. It is understood that each yarn of the plurality of weft yarns and/or warp yarns can have a denier value between any two foregoing values. For example, and without limitation, each yarn of the plurality of weft yarns and/or warp yarns can have a denier value from about 12 denier to about 25 denier, or from about 30 denier to about 85 denier, or from about 110 denier to about 185 denier.

In still further aspects, each yarn of the plurality of weft yarns and/or warp textured yarns can comprise from about 8 to about 150 fibers, including exemplary values of about 10 fibers, about 15 fibers, about 20 fibers, about 50 fibers, about 70 fibers, about 100 fibers, and about 120 fibers. It is understood that each yarn of the plurality of weft yarns and/or warp yarns can comprise any number of fibers between any two foregoing values. For example, and without limitation, each yarn of the plurality of weft yarns and/or warp yarns can comprise from about 8 to 25 fibers or from about 27 fibers to about 85 fibers, or from about 110 fibers to about 145 fibers.

In still further aspects, the fiber can have any diameter suitable for the desired application. In certain aspects, the fiber can have a diameter from about 1 μm to about 25 μm, including exemplary values of about 2 μm, about 5 μm, about 7 μm, about 10 μm, about 12 μm, about 15 μm, about 17 μm, about 20 μm, and about 22 μm. It is understood that the fiber can have any diameter between any two foregoing values. For example, and without limitation, the fiber can have a diameter from about 3 μm to about 8 μm, or from about 11 μm to about 22 μm, or from about 15 μm to about 25 μm.

In still further aspects, the textured yarn can have a second stress-relaxation response. It is understood that the second stress-relaxation response of the textured yarn can be the same or different from the first stress-relaxation response of the textile. It is further understood that in some exemplary aspects, the textured yarn is provided with the second stress-relaxation response by the yarn manufacturer. While in other aspects, the second stress-relaxation response can be provided to the yarn prior to weaving it into the textile by a skilled practitioner.

In still further aspects, the first stress-relaxation response can be defined by first heat-set conditions of the textile and the second stress-relaxation response. As discussed in detail above, the first stress-relaxation response can be the same as the second stress-relaxation response or different.

In certain aspects and as disclosed herein, the first and/or second heat-set conditions can comprise a heat-set temperature from about 90° C. to about 220° C., including exemplary values of about 95° C., about 100° C., about 110° C., about 120° C., about 130° C., about 140° C., about 150° C., about 160° C., about 170° C., about 180° C., about 190° C., about 200° C., and about 210° C. It is understood that the first and/or second heat-set conditions can have a heat-set temperature value that is any value between any two foregoing values. For example, and without limitation, the heat-set temperature can be from about 90° C. to about 120° C., or from about 100° C. to about 180° C., or from about 150° C. to about 220° C.

In still further aspects, the first and/or second heat-set conditions can comprise a heat setting time from about 2 min to about 1 h, including exemplary values of about 5 min, about 10 min, about 15 min, about 20 min, about 25 min, about 30 min, about 35 min, about 40 min, about 45 min, about 50 min, and about 55 min. It is understood that the first and/or second heat-set conditions can have any heat-setting time between any two foregoing values. For example, and without limitation, the heat-setting time can be from about 5 min to about 20 min, or from about 7 min to about 25 min, or from about 15 min to about 60 min.

In still further aspects, the first and/or second heat-set conditions can comprise a heat-set temperature from about 90° C. to about 220° C., including exemplary values of about 95° C., about 100° C., about 110° C., about 120° C., about 130° C., about 140° C., about 150° C., about 160° C., about 170° C., about 180° C., about 190° C., about 200° C., and about 210° C., and a heat setting time from about 2 min to about 1 h, including exemplary values of about 5 min, about 10 min, about 15 min, about 20 min, about 25 min, about 30 min, about 35 min, about 40 min, about 45 min, about 50 min, and about 55 min.

In still further aspects and as disclosed above, the plurality of warp yarns and/or the plurality of weft yarns can further, optionally, comprise at least one yarn selected from polyolefins, polyamides, polyesters, co-polyesters, polyurethanes, natural fibers, polytetrafluoroethylene, polyvinylidene fluoride, polyethers, polyureas, copolymers thereof, or a combination thereof. In certain aspects, such a yarn can also comprise a composite fiber. It is understood that, as used herein, the composite fiber relates to a fiber that can comprise one or more different materials. In certain aspects, the composite fiber is a bicomponent fiber that can have any configuration, as for example, and without limitation, a side-by-side configuration, a core-sheath configuration, a segmented configuration, an islands-in-the-sea configuration, or any combination thereof.

In still further aspects, such a yarn that is different from the textured yarn can have a size from about 10 to about 200 denier, including exemplary values of about 20 denier, about 50 denier, about 70 denier, about 100 denier, about 120 denier, about 150 denier, and about 170 denier. It is understood that each yarn of the plurality of weft yarns and/or warp yarns can have a denier value between any two foregoing values. For example, and without limitation, each yarn of the plurality of weft yarns and/or warp yarns can have a denier value from about 12 denier to about 25 denier, or from about 30 denier to about 85 denier, or from about 110 denier to about 185 denier. It is further understood that untextured and textured yarns can have the same denier or different.

In still further aspects, each yarn of the plurality of weft yarns and/or warp untextured yarns can comprise from about 8 to about 150 fibers, including exemplary values of about 10 fibers, about 15 fibers, about 20 fibers, about 50 fibers, about 70 fibers, about 100 fibers, and about 120 fibers. It is understood that each yarn of the plurality of weft yarns and/or warp yarns can comprise any number of fibers between any two foregoing values. For example, and without limitation, each yarn of the plurality of weft yarns and/or warp yarns can comprise from about 8 to 25 fibers or from about 27 fibers to about 85 fibers, or from about 110 fibers to about 145 fibers. It is further understood that untextured and textured yarns can have the same number of fibers or different.

In still further aspects, the fiber in the untextured yarn can have any diameter suitable for the desired application. In certain aspects, the fiber in the untextured yarn can have a diameter from about 1 µm to about 25 µm, including exemplary values of about 2 µm, about 5 µm, about 7 µm, about 10 µm, about 12 µm, about 15 µm, about 17 µm, about 20 µm, and about 22 µm. It is understood that the fiber can have any diameter between any two foregoing values. For example, and without limitation, the fiber can have a diameter from about 3 µm to about 8 µm, or from about 11 µm to about 22 µm, or from about 15 µm to about 25 µm. It is further understood that the fiber present in the untextured and textured yarns can have the same diameter or different.

It is further understood that the aspects described herein comprise yarns that are biocompatible. Also disclosed herein are aspects that comprise yarns comprising permanent implant grade polymers. In still further aspects, the permanent implant grade polymers can include but are not limited to polyesters, co-polyesters, ultra-high molecular weight polyethylene, polyethylene, polypropylene, polytetrafluoroethylene, expanded polytetrafluorethylene, polyvinylidene fluoride, polyurethane, polyethers, polyureas, nylon, copolymers thereof, or a combination thereof.

In still further aspects, the disclosed herein textile can comprise a first edge and an opposite second edge. It is understood that in certain aspects, at least a portion of the textile adjacent to the first and/or second edge comprises a plain weave, a twill weave, a satin weave, any derivative, or any combination thereof.

In still further aspects, the plurality of repeating cell units present in the textile can comprise from about 1 to about 30 cells per inch, including exemplary values of about 2 cells per inch, about 7 cells per inch, about 5 cells per inch, about 10 cells per inch, about 12 cells per inch, about 15 cells per inch, about 17 cells per inch, about 20 cells per inch, about 22 cells per inch, about 25 cells per inch, about 27 cells per inch.

In still further aspects, each of the plurality of repeating cell units comprises from about 8 to 40 pick repeats, including exemplary values of about 12 pick repeats, about 16 pick repeats, about 20 pick repeats, about 24 pick repeats, about 28 pick repeats, about 32 pick repeats, and about 36 pick repeats.

In still further aspects, the textile is configured to be sutured. It is understood that any known in the art sutures can be used. In certain exemplary and unlimiting aspects, the suture is a textile filament. In yet other aspects, the suture is any filament that can be used for the desired application.

In still further aspects, disclosed herein is also a tissue scaffold material that can comprise the disclosed herein textile.

The exemplary aspects of the disclosed textiles are shown in FIGS. 1-4 and are described in more detail in the Experimental Section.

Implantable Medical Device

Paravalvular leak (PVL) is a complication associated with the implantation of a prosthetic heart valve. PVL refers to blood flowing through a channel between the structure of the implanted valve and cardiac tissue as a result of a lack of appropriate sealing. The majority of PVL are crescent, oval, or roundish-shaped, and their track can be parallel, perpendicular, or serpiginous. Transcatheter Heart Valve (THV) procedures generally use either a substantially inelastic woven cloth or a stretchable knitted cloth for PVL sealing.

When comparing the woven cloth with the knitted cloth for PVL sealing, the substantially inelastic woven cloth has the advantage of providing better dimensional stability that helps in procedures dealing with joining the valve components together using sutures and laser cutting of components. Further, the pore sizes and pore densities in a woven cloth can be engineered to balance sealing and tissue ingrowth functions. On the other hand, knitted cloth provides better stretchability than woven cloth construction. Stretchability helps in reducing stress on a tissue to which the medical device comprising the textile is attached.

With the next generation of THV frame designs that have changing frame dimensions, one of the requirements is to have the PVL seal cloth and/or the frame inner cloth to adapt to the changing frame dimensions. Thus, there is a need for a cloth having controlled stretchability and lower profile to provide improved compliance by reducing potential stresses at locations where the cloth is secured to a bodily lumen.

The present disclosure describes the aspects addressing the issues disclosed above. In one aspect, described herein is an implantable medical device comprising: an annular frame having an inflow end, an outflow end, and a longitudinal axis; and a sealing element secured to the frame, wherein the sealing element comprises: textile defined by a first surface and an opposite second surface and having a longitudinal axis and a transverse axis and having a first thickness, a first width, and a first length, and comprising: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversible arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response; and wherein the implantable medical device is configured to radially collapse to a collapsed configuration and radially expand to an expanded configuration.

It is understood that any of the textiles described above can be used in the disclosed implantable medical device.

In still further aspects, the applied stress can comprise stretching the textile in one or more directions along the longitudinal, the transverse axis, or across of the textile, the second dimension selected from the second length or width is greater than 0 to about 300%, including exemplary values of about 1%, about 5%, about 10%, about 20%, about 30%, about 40%, about 50%, about 60%, about 70%, about 80%, about 90%, about 100%, about 120%, about 150%, about 170%, about 200%, about 220%, about 250%, and about 260% of the first dimension selected from the first length or width, as measured in the stretch direction. It is further understood that the textiles disclosed herein can have a different response to the same stress as measured along the textile width, length, or thickness. For example, when the textile is stressed by stretching, the first length of the textile can change from the relaxed position to the second length that is greater than 0% to about 300% of the first length. However, it is also understood that in certain aspects, if the textile, for example, is stressed by stretching along the first length or along the longitudinal axis, while the second length can be greater than 0% to about 300%, the second width can shrink to greater than 0% to about 300% of the first width. Similarly, in certain aspects, if the textile, for example, is stressed by stretching along the first length or along the longitudinal axis, while the second length can be greater than 0% to about 300%, the second thickness can shrink to greater than 0% to about 300% of the first thickness. It is understood that the textile used in these devices can comprise any textiles having any properties disclosed above.

In still further aspects, the applied stress can comprise compression across the first thickness of the textile, and wherein the textile exhibits compressibility of 50-95%, including exemplary values of about 55%, about 60%, about 65%, about 70%, about 75%, about 80%, about 85%, and about 90% of the first thickness under a loading force of about 45 to about 56 lbs, including exemplary values of about 46 lbs, about 47 lbs, about 48 lbs, about 49 lbs, about 50 lbs, about 51 lbs, about 52 lbs, about 53 lbs, about 54 lbs, and about 55 lbs. While in other aspects, the applied stress can comprise an expansion of the medical device to arrive at the expanded configuration.

Figure 5:
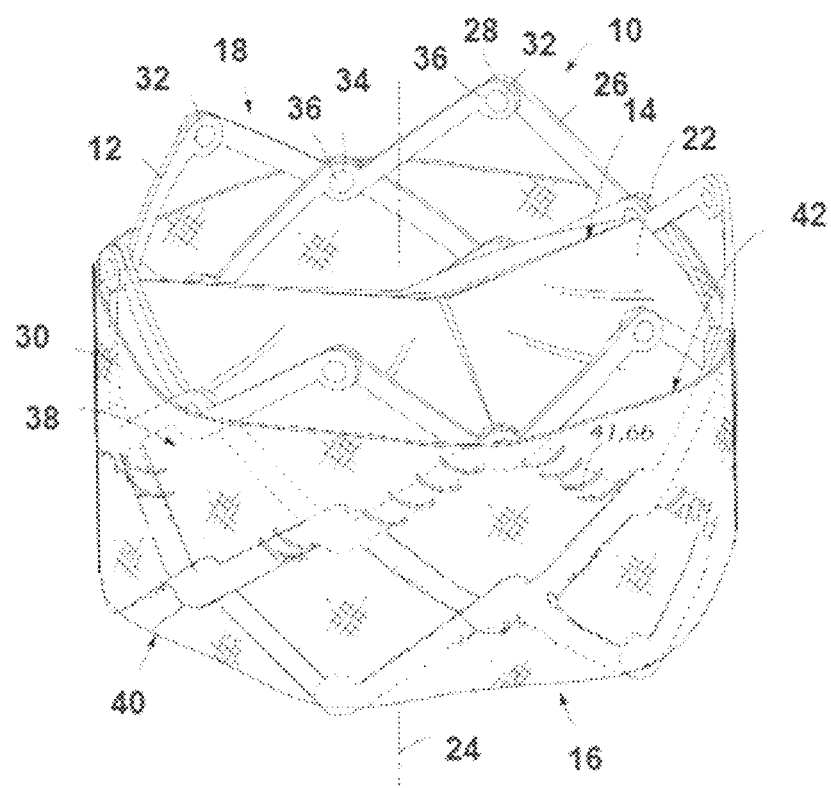
FIG. 5 shows a perspective view of an exemplary implantable medical device, such as a prosthetic heart valve, including an exemplary aspect of an exemplary textile used as a paravalvular leakage seal.
Figure 6:
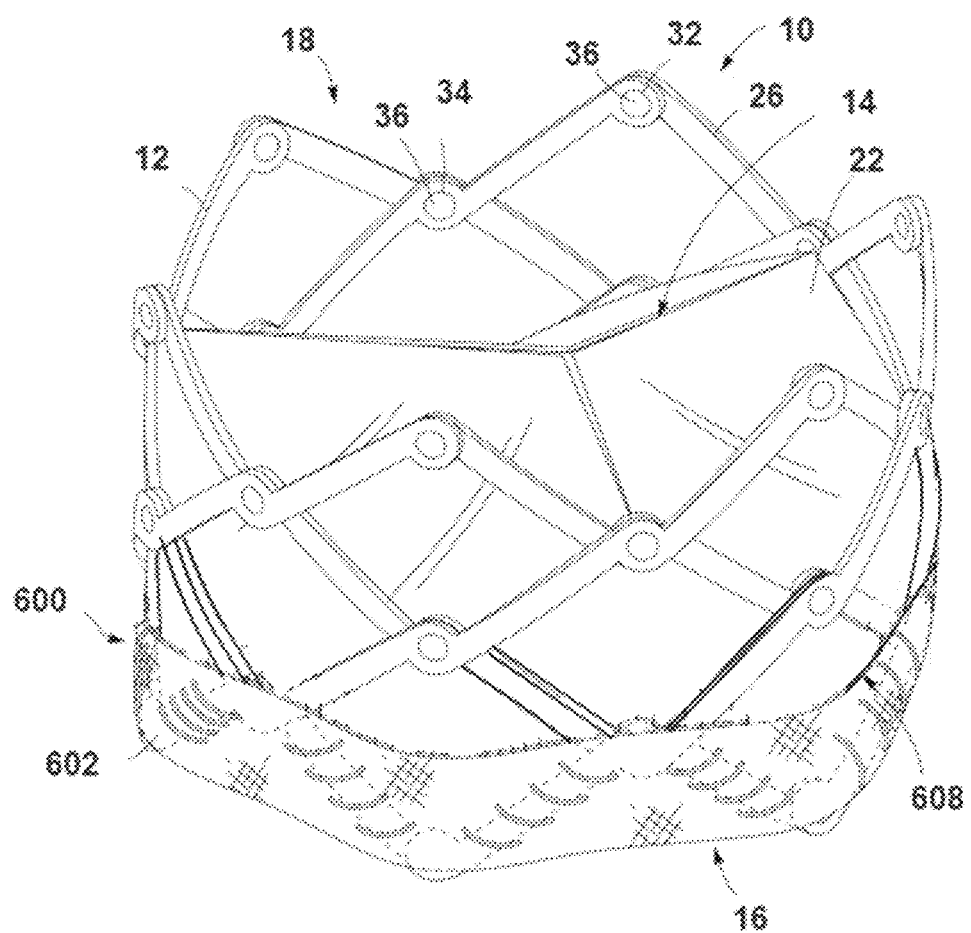
FIG. 6 shows a perspective view illustrating an exemplary implantable medical device, such as a prosthetic heart valve, including another aspect of a paravalvular leakage seal, including an exemplary textile used as a paravalvular leakage seal.

The exemplary aspects of the implantable medical device are shown in FIGS. 5-6. One exemplary and unlimiting aspect encompasses medical devices that are prosthetic heart valves. For example, and without limitation, FIG. 5 illustrates an exemplary aspect of a radially collapsible and expandable prosthetic valve 10 shown in its deployed, expanded configuration. The prosthetic valve can include an annular stent or frame 12, and a leaflet structure 14 situated within and coupled to the frame 12. The frame 12 can have an inflow end portion 16 and an outflow end portion 18. The leaflet structure can comprise a plurality of leaflets 22. In certain aspects, the leaflet structure can comprise three leaflets. In such exemplary aspects, such three leaflets can be arranged to collapse in a tricuspid arrangement similar to the aortic valve. Alternatively, the prosthetic valve can include two leaflets 22 configured to collapse in a bicuspid arrangement similar to the mitral valve, or more than three leaflets, depending upon the particular application. The prosthetic valve 10 can define a longitudinal axis 24 extending through the inflow end portion 16 and the outflow end portion 18.

The frame 12 can be made of various biocompatible materials, such as stainless steel or a nickel-titanium alloy ("NiTi"), for example, Nitinol. With reference to FIG. 5, the frame 12 can include a plurality of interconnected lattice struts 26 arranged in a lattice-type pattern and forming a plurality of apices 28 at the outflow end 18 of the prosthetic valve. The struts 26 can also form similar apices at the inflow end 16 of the prosthetic valve (which are covered by a skirt 30 described in greater detail below). The lattice struts 26 are shown positioned diagonally or offset at an angle relative to and radially offset from the longitudinal axis 24 of the prosthetic valve. It is understood that the configuration depicted in FIG. 5 is exemplary only, and in other aspects, the lattice struts 26 can be offset by a different amount than depicted in FIG. 5 or some or all of the lattice struts 26 can be positioned parallel to the longitudinal axis of the prosthetic valve.

The lattice struts 26 can be pivotably coupled to one another. In the illustrated aspect, for example, the end portions of the struts 26 forming the apices 28 at the outflow end 18 and at the inflow end 16 of the frame can have a respective opening 32. The struts 26 also can be formed with apertures 34 located between the opposite ends of the struts. Respective hinges can be formed at the apices 28 and at the locations where struts 26 overlap each other between the ends of the frame via fasteners 36, which can comprise rivets or pins that extend through the apertures 32, 34. The hinges can allow the struts 26 to pivot relative to one another as the frame 12 is expanded or contracted, such as during assembly, preparation, or implantation of the prosthetic valve 10. For example, the frame 12 (and, thus, the prosthetic valve 10) can be manipulated into a radially compressed or contracted configuration, coupled to a delivery apparatus, and inserted into a patient for implantation. Once inside the body, the prosthetic valve 10 can be manipulated into an expanded state and then released from the delivery apparatus. Additional details regarding the frame 12, the delivery apparatus, and devices and techniques for radially expanding and collapsing the frame can be found in U.S. Publication No. 2018/0153689, which is incorporated herein by reference. Additional details about such an exemplary prosthetic valve can also be found in U.S. Publication No. 2019/0046314, which is incorporated herein by reference.

As further illustrated in FIG. 5, the prosthetic valve 10 can include a sealing element configured as a skirt 30. The skirt 30, as shown herein, can comprise any textile materials disclosed above. It is understood that in some aspects, the skirt 30 is an outer skirt. In such aspects, another skirt (not shown) known as an inner skirt can be attached to the frame underneath of the outer skirt 30. However, in some aspects, the textile materials used in the outer skirt 30 can also be used in the inner skirt (not shown here). Yet, in some aspects, the inner skirt does not comprise the textile materials used in the outer skirt. In still further aspects, only one skirt is used. In such aspects, such a skirt can comprise any of the textile materials described herein.

The skirt 30 can be configured to establish a seal with the native tissue at the treatment site to reduce or prevent paravalvular leakage. The skirt 30 can include a main body portion 38 disposed about an outer circumference of the frame 12. The skirt 30 can be secured to the frame by, for example, a plurality of sutures 41 extending in a zig-zag pattern along selected strut members 26 between a first edge portion (e.g., an inflow edge portion) 40 and a second edge portion (e.g., an outflow edge portion) 42 of the skirt 30. For example, in certain aspects, the skirt 30 can be sutured to the frame 12 along a suture line 66 corresponding to a scalloped edge defined by the leaflets 22, which can allow the valve to radially expand and contract without interference from or pinching of the skirt. Further details regarding transcatheter prosthetic heart valves, including the manner in which the leaflets 22 can be coupled to the frame 12, can be found, for example, in U.S. Pat. Nos. 6,730,118, 7,393,360, 7,510,575, 7,993,394, and 8,652,202, which are incorporated herein by reference in their entireties.

It is understood that the skirt 30 comprising the disclosed herein textile materials provides better dimensional stability that helps in procedures dealing with joining the valve components together using sutures and laser cutting of components. In still further aspects, it is understood that the presence of a 3-D honeycomb cellular structure of the disclosed textile allows balancing sealing and tissue ingrowth functions. In yet further aspects, the controlled stretchability of the disclosed textile allows the reduction of the valve stresses on a tissue to which the medical device comprising the textile is attached. The disclosed textile allows the skirt 30 to adapt to the changing frame dimensions and provides a low profile for such a skirt.

FIG. 6 illustrates a prosthetic valve 10, including another aspect of a sealing member or skirt 600. In the illustrated and unlimiting aspect, the skirt 600 comprises a textile material as described herein and configured as a fabric strip 602 having an edge portion 608. In certain exemplary aspects, the skirt 600 can be secured to struts 26 to form layers of the skirts (not shown). It is further understood that any configurations of the skirt coupling with the frame can be used depending on the desired application.

The textile material described herein can be used in any sealing element aspect and in any combination with any of the prosthetic valves and/or frame aspects. It is understood that a prosthetic heart valve can also include any of the textile materials described herein, or portions thereof, in any combination.

The textiles of the prosthetic sealing members described herein can be configured to promote a biological response in order to form a seal between the prosthetic valve and the surrounding anatomy. In certain configurations, the sealing elements described herein can be configured to form a seal over a selected period of time. For example, in certain aspects, the presence of the 3-D honeycomb cellular pattern, open, porous nature of filaments, yarns, etc., can allow a selected amount of paravalvular leakage around the prosthetic valve in the time period following implantation. The amount of paravalvular leakage past the seal structure may be gradually reduced over a selected period of time as the biological response to the textile causes blood clotting, thrombus formation, etc. In some aspects, the sealing members, and in particular the 3-D honeycomb cellular pattern of the textile, filaments, yarns, etc., of the paravalvular sealing structure, can be treated with one or more agents that inhibit the biological response to the sealing structures. For example, in certain exemplary aspects, the textiles having a 3-D honeycomb cellular pattern or separated yarns and fibers can be treated with heparin. In certain aspects, the amount or concentration of the agent(s) can be selected such that the agents are depleted after a selected period of time (e.g., days, weeks, or months) after valve implantation. As the agent(s) are depleted, the biological response to the textile or yarns or fibers of the sealing structures can increase such that a paravalvular seal forms gradually over a selected period of time. This can be advantageous in patients suffering from left atrial remodeling (e.g., due to mitral regurgitation) by providing an opportunity for the remodeling to reverse as regurgitation past the prosthetic valve is gradually reduced.

Figure 7:
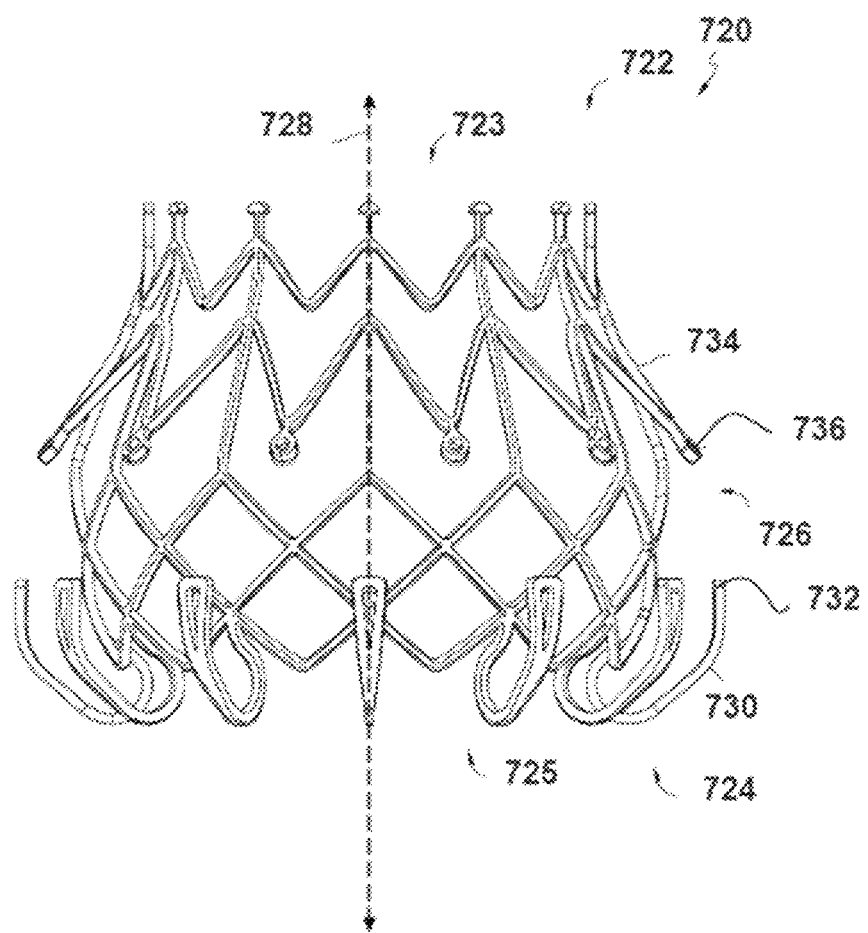
FIG. 7 is a front view of an aspect of a frame used in an exemplary implantable medical device.

In still further aspects disclosed is an implantable medical device comprising: a self-expanding frame having an upper region, an intermediate region and a lower region, wherein the frame is configured to radially expand and contract for deployment within a body cavity, and wherein the self-expanding frame comprises a plurality of anchoring members disposed along the lower region; wherein at least a portion of at least some of the plurality of anchoring members is enclosed within a textile material, wherein the textile material is defined by a first surface and an opposite second surface, having a longitudinal axis and a transverse axis, and having a first thickness, a first width, and a first lengths, and comprising: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile exhibits a first stress-relaxation response; and wherein the textile material is biocompatible and behaves as a cushion, and the textile exhibits compressibility of 50-95% of the first thickness under a loading force of about 45 to about 56 lbs. These exemplary aspects of such implantable medical devices are shown in FIGS. 7-10. One exemplary aspect of the possible frame is shown in FIG. 7. Such an exemplary frame 720 can have a proximal end 722 and a distal end 724. In some aspects, such as the illustrated aspect, the frame 720 can include an intermediate portion 726, which has a greater diameter than the diameter of the frame 720 at the proximal and/or distal ends 722, 724 when the frame 720 is in an expanded configuration. In some aspects, such as the illustrated aspect, the frame 720 can include an intermediate portion 726, which has a greater cross-sectional area than the cross-sectional area of the frame 720 at the proximal and/or distal ends 722, 724 when the frame 720 is in an expanded configuration. The frame 720 can be designed to expand radially and contract for deployment within a body cavity, such as at a heart valve location such as the mitral valve. For example, as described in greater detail in U.S. Publication Nos. 2014/0277390, 2014/0277422, and 2014/0277427, the frame 720 can include a plurality of struts, which define a plurality of foreshortening cells. In some aspects, the frame 720 can be designed to radially and contract radially from a longitudinal axis 728 extending through the frame 720.

In still further aspects, the exemplary frame shown in FIG. 7 can include one or more distal anchors 730. The distal anchors 730 can be positioned along or proximate a distal end 724 of the frame 720 and can be connected to the frame 720. The distal anchors 730 can be designed such that when the frame 720 is in an expanded configuration, an end or tip 732 of each distal anchor 730 is positioned radially outward from the frame 720 and extends generally in a proximal direction. In some aspects, the disclosed exemplary implantable medical device can optionally include one or more proximal anchors 734. The proximal anchors 734 can be positioned along or proximate a proximal end 722 of the frame 720 and can be connected to the frame 720. The proximal anchors 734 can be designed such that when the frame 720 is in an expanded configuration, an end or tip 736 of each proximal anchor 734 is positioned radially outward from the frame 720 and extends generally in a distal direction.

Figure 8:
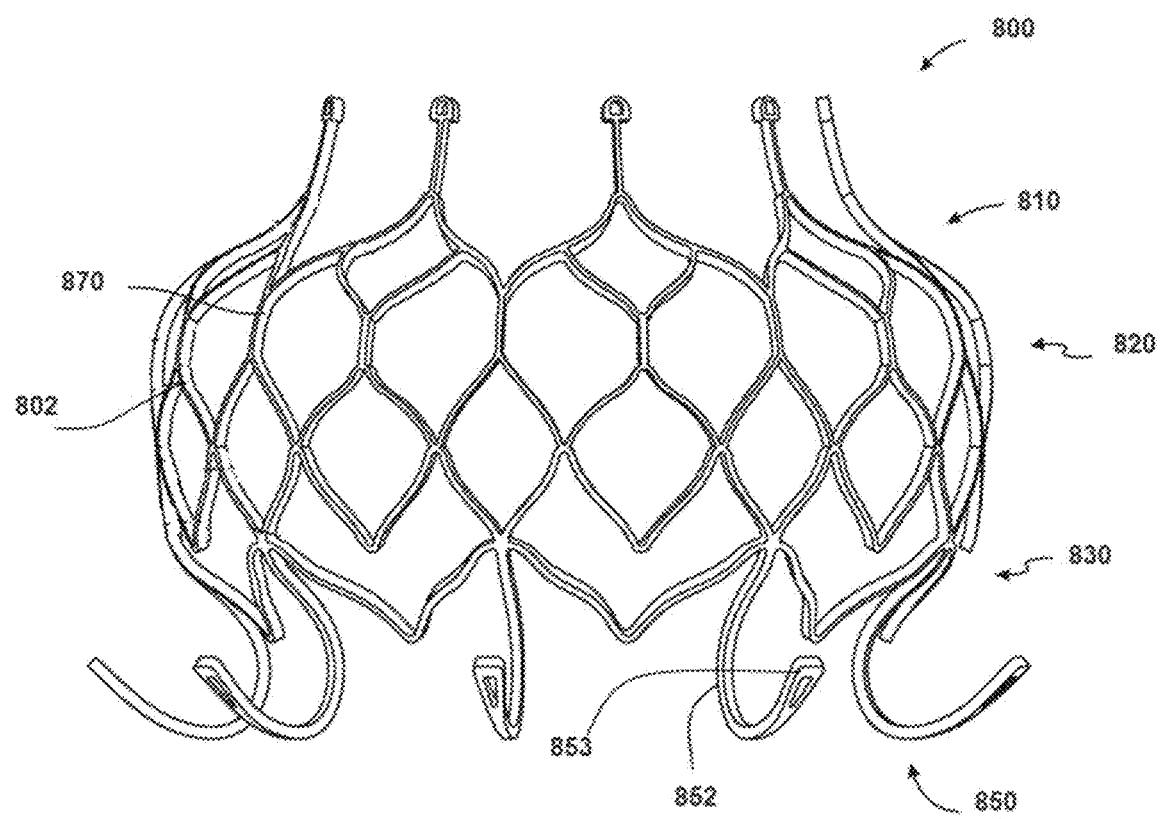
FIG. 8 is a front elevation view of an aspect of a frame (in the expanded state) used in another exemplary implantable medical device.

Another aspect of the exemplary frame 800 is shown in FIG. 8. In such an aspect, the frame 800 is shown in an expanded configuration. The frame 800 can include a frame portion 802 having an upper region 810, an intermediate region 820, and a lower region 830. In certain aspects, the intermediate portion 820 can have a greater diameter than the diameter of the frame 800 at the proximal and/or distal ends 810 and 830 when the frame 800 is in an expanded configuration. In some aspects, such as the illustrated aspect, the frame 800 can include an intermediate portion 820, which has a greater cross-sectional area than the cross-sectional area of the frame 800 at the proximal and/or distal ends 810 and 830 when the frame 800 is in an expanded configuration. A longitudinal axis (not shown) of the frame 800 may be defined as the central axis that extends through the center of the frame 800 between the upper and lower ends of the frame 800. In some aspects, the frame 800 may be oriented such that the upper region 810 is a proximal portion, and the lower region 830 is a distal portion. The frame 800 can include a plurality of anchoring members 850. In some aspects, the frame 800 may be oriented such that the plurality of anchoring members 850 are a distal anchoring members. As shown in the illustrated aspect, the plurality of anchoring members 850 can include one or more anchors. For example, and without limitation, as shown in the illustrated aspect, the plurality of anchoring members 850 can include nine anchors, each including a strut 852 extending from a lower region 830 of the frame body 802 and a tip 853.

Figure 9A:
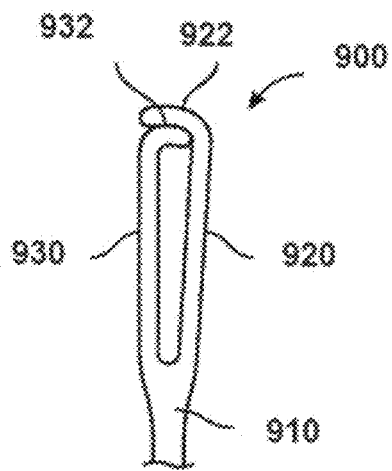
FIGS. 9A-9B show an exemplary anchoring tip in a collapsed (FIG. 9A) and expanded configuration (FIG. 9B).
Figure 9B:
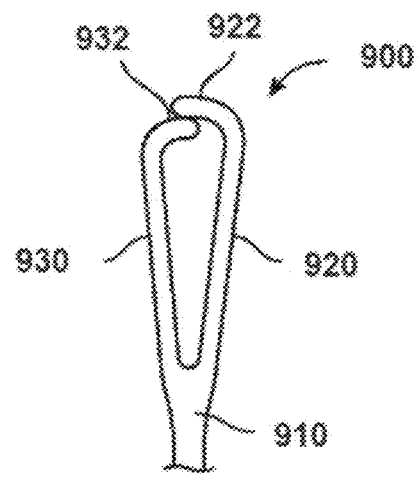

An exemplary and unlimiting anchoring member 900 is shown in FIGS. 9A and 9B. It is understood that this anchoring member 900 is only exemplary, and any other configurations of the anchoring members can be present. The exemplary member 900 can between a collapsed configuration (as shown in FIG. 9A) and an expanded configuration (as shown in FIG. 9B). In transitioning from the collapsed configuration to the expanded configuration, the lateral dimension (or width) of the anchoring member 900 can increase. The anchoring member 900 can be attached to a frame body (not shown) via one or more struts 910. The exemplary anchoring member 900 can also comprise one or more prongs 920, 930 having tips 922, 932. In still further aspects, the tips 922 and 932 can slide relative to each other when transitioning between the collapsed configuration and the expanded configuration. Other unlimiting and exemplary anchoring members can be found in U.S. Patent Application Publication No. 2019/0328515, which is incorporated herein by reference in its whole entirety.

Figure 10:
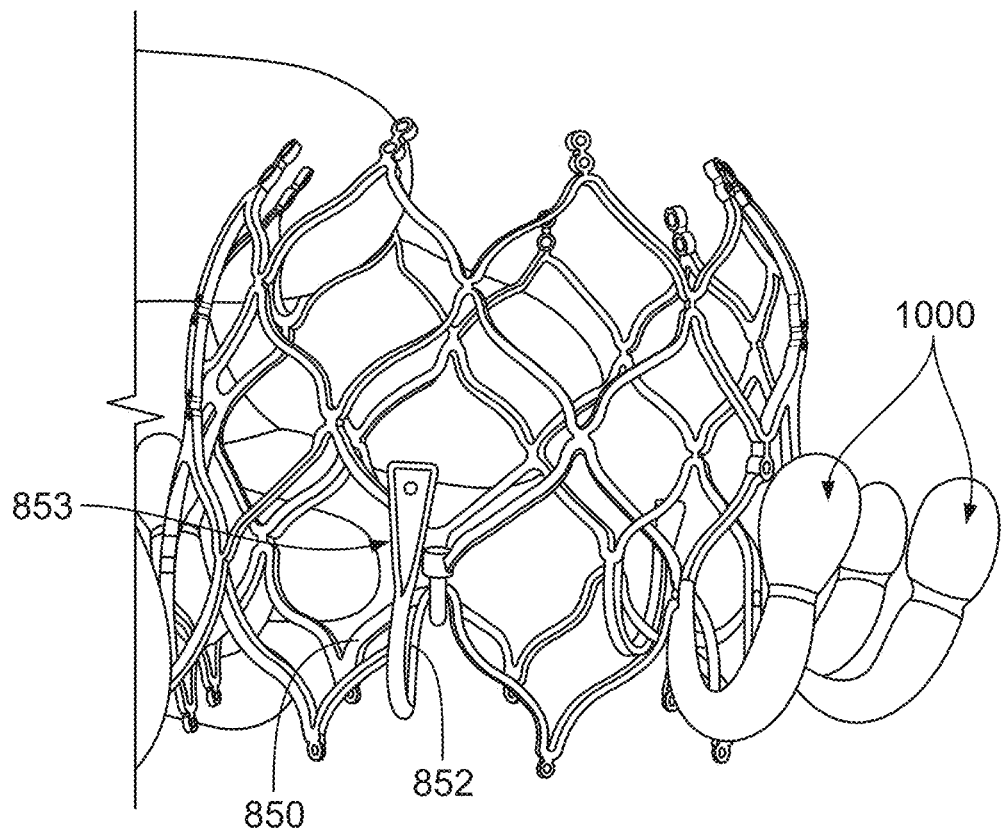
FIG. 10 shows a photograph of an exemplary implantable medical device having exemplary anchors, as shown in FIGS. 7-9 with an exemplary textile serving as a cushion.

In still further aspects, at least a portion of at least some of the plurality of anchoring members is enclosed within any of the disclosed herein textile materials. In still further exemplary aspects, the textile material used for the disclosed enclosure can be defined by a first surface and an opposite second surface, having a longitudinal axis and a transverse axis, and having a first thickness, a first width, and a first length, and comprise: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile exhibits a first stress-relaxation response; and wherein the textile material is biocompatible and behaves as a cushion, and the textile exhibits compressibility of 50-95% of the first thickness under a loading force of about 45 to about 56 lbs. An exemplary and unlimiting aspect is shown in FIG. 10. FIG. 10 shows a photograph of a frame, similar to one shown in FIG. 8, having a plurality of anchoring members 850 each having a strut 852 and a tip 853. A textile material described herein is used to form a cushion 1000 around the struts and tips of the plurality of anchoring members. In certain aspects, the cushion 1000 can be formed from two separate pieces of the disclosed textile, such as an inner portion positioned within a covering such that the covering forms a layer surrounding the inner portion. In yet other aspects, the cushion 1000 can be formed by the enclosure of the at least a portion of at least some of the plurality of anchoring members is formed by one or more layers of the textile material. It is understood that these layers of the textile material can be formed by separate fabrics or by one fabric wrapped around the anchoring members in any desired fashion.

In still further aspects, the enclosure can optionally comprise other materials that are different from the disclosed textile material. For example, and without limitation, if the enclosure comprises an inner and outer portion, the inner portion can comprise a textile structure such as a braided, knitted or woven cloth sleeve, while the outer portion comprises the disclosed herein textile material. It is understood that the use of the cushions 1000 on the anchoring members can maintain a smaller form factor while the implantable medical device is in a contracted state for delivery. It is understood that the aspects described herein include an aspect that only some of the plurality of the anchoring members are enclosed in the disclosed textile. Yet other aspects described herein include all of the plurality of the anchoring members being enclosed in the disclosed textile. In still further aspects, only a portion of the anchoring members is enclosed, while in other aspects, a full body of the anchoring members is enclosed with the textile material.

It is understood that in certain aspects, cushions, similar but are not limited to those shown in FIG. 10, can advantageously increase the contact area of the plurality of anchor members on the tissue. It can further reduce trauma between the plurality of anchor members and such tissue. Moreover, this can facilitate the growth of tissue in and/or around the plurality of anchor members. Even further, the disclosed herein cushions can also beneficially reduce any potential trauma that can be caused when an adjacent anchor member to the cushioned anchor member does not have a disclosed cushion. It is further understood that a final thickness of each of the enclosures around any or all of the plurality of anchoring members can be the same or different and can be selected based on the specific application. Some of the plurality of anchoring members can have an enclosure within the disclosed textile such that the final thickness of the enclosure can be thicker than the final thickness of the enclosures. It is understood that if the frame of the medical device comprises both distal and proximal anchors, any portion of any of these anchors can also be enclosed in the disclosed herein textile material. In still further aspects, additional coverage can be positioned on the cushion made of the disclosed textile material.

In still further aspects and as disclosed herein, the self-expanding frame comprises one or more struts, and at least a portion of the one or more struts can also be enclosed within the disclosed textile material. In still further aspects, the textile material can be stitchable with any suture suitable for the desired application.

It is understood that the disclosed textile material can be used as a cushion in any of the implantable medical devices disclosed herein. In yet other aspects, the implantable medical device is a prosthetic mitral valve.

Methods

The present disclosure also provides for a method comprising weaving a plurality of weft yarns and a plurality of warp yarns to form a textile, wherein the formed textile is defined by a first surface and an opposite second surface and having a longitudinal axis and a transverse axis, and having a first thickness, a first width, and a first lengths and wherein at least a portion of the first surface and/or the second surface has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversible arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response.

It is understood that any methods known in the art to form a 3-D honeycomb pattern can be utilized. In still further aspects, the textile formed by the disclosed methods can comprise any textile disclosed above. In still further aspects and as disclosed herein, the textured yarn used to form the disclosed textile can have a second stress-relaxation response.

In still further aspects, the methods disclosed herein comprise a step of exposing the textile to first heat-set conditions effective to provide the first stress-relaxation response of the textile.

In some aspects, it is understood that the first stress-relaxation response of the textile can only be defined by the first heat-set conditions. While, in other aspects, the first stress-relaxation response of the textile can be defined by the combination of the first heat-set conditions and the second stress-relaxation response of the textured yarn used in the textile. It is understood that the second stress-relaxation response of the textured yarn can be obtained by second heat-set conditions. It is further understood that the second heat-set conditions can be applied to the textured yarn during the yarn manufacturing or at any other step if the manufacturing conditions allow that.

In still further aspects, the first and/or second heat-set conditions can be obtained by the heat setting temperature or heat exposure time or a combination of both.

In certain aspects and as disclosed herein, the first and/or second heat-set conditions can comprise a heat-set temperature from about 90° C. to about 220° C., including exemplary values of about 95° C., about 100° C., about 110° C., about 120° C., about 130° C., about 140° C., about 150° C., about 160° C., about 170° C., about 180° C., about 190° C., about 200° C., and about 210° C. It is understood that the first and/or second heat-set conditions can have a heat-set temperature value that is any value between any two foregoing values. For example, and without limitation, the heat-set temperature can be from about 90° C. to about 120° C., or from about 100° C. to about 180° C., or from about 150° C. to about 220° C.

In still further aspects, the first and/or second heat-set conditions can comprise a heat setting time from about 2 min to about 1 h, including exemplary values of about 5 min, about 10 min, about 15 min, about 20 min, about 25 min, about 30 min, about 35 min, about 40 min, about 45 min, about 50 min, and about 55 min. It is understood that the first and/or second heat-set conditions can have any heat-setting time between any two foregoing values. For example, and without limitation, the heat-setting time can be from about 5 min to about 20 min, or from about 7 min to about 25 min, or from about 15 min to about 60 min.

In still further aspects, the first and/or second heat-set conditions can comprise a heat-set temperature from about 90° C. to about 220° C., including exemplary values of about 95° C., about 100° C., about 110° C., about 120° C., about 130° C., about 140° C., about 150° C., about 160° C., about 170° C., about 180° C., about 190° C., about 200° C., and about 210° C., and a heat setting time from about 2 min to about 1 h, including exemplary values of about 5 min, about 10 min, about 15 min, about 20 min, about 25 min, about 30 min, about 35 min, about 40 min, about 45 min, about 50 min, and about 55 min.

It is further understood that any methods of heating can be used depending on the desired application. In certain and unlimiting aspects, the heat-setting can be performed using a hot-air environment when the textile is in a relaxed state. However, it is understood that in some aspects, the heat-set can also be performed on the textile when a stress is applied to the textile if the desired application requires it.

Figure 11:
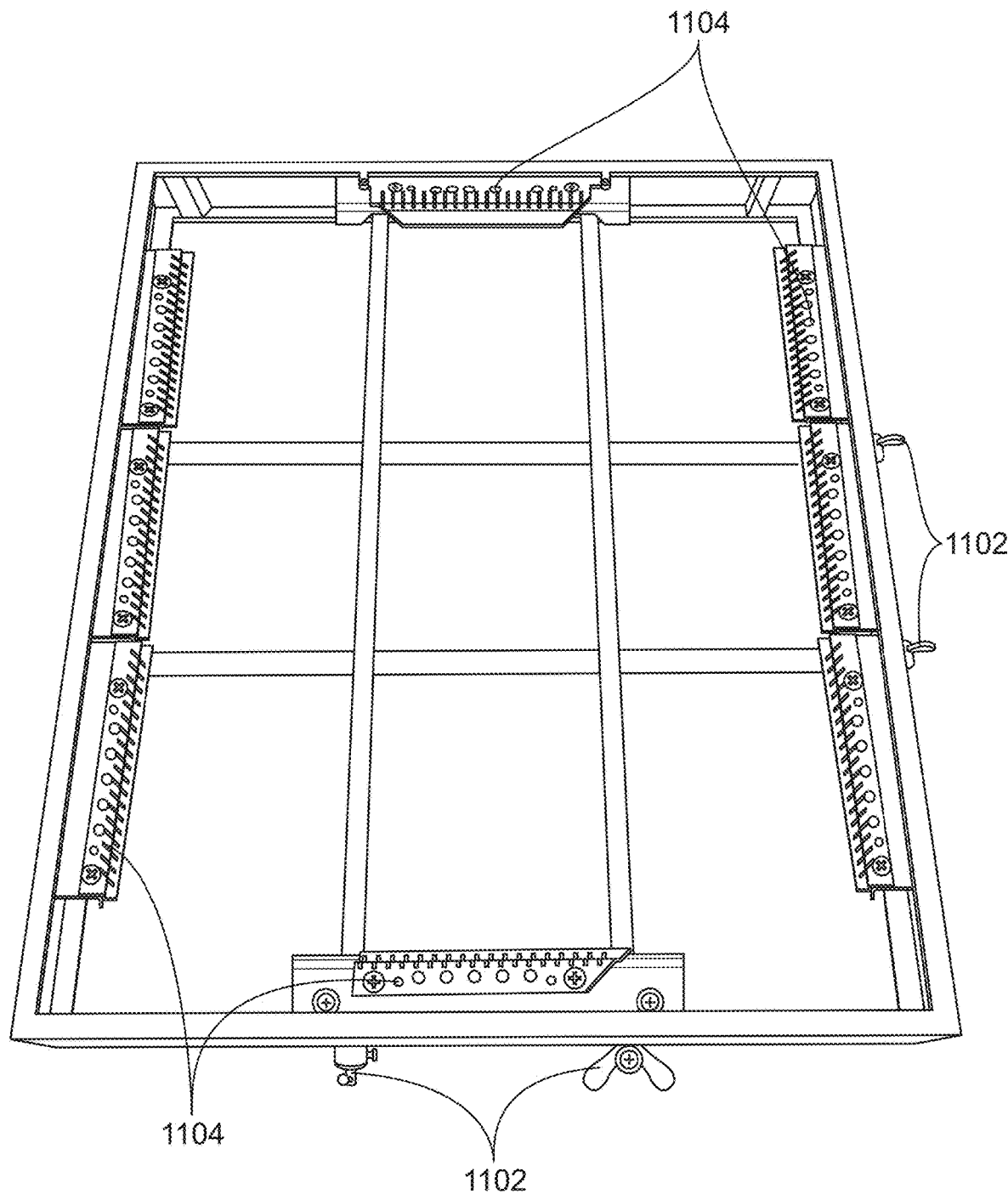
FIG. 11 shows a heat-setting fixture used to form an exemplary textile.

An exemplary heat-setting feature is shown in FIG. 11. The feature is utilized to control the tension on the cloth in two directions or in all four directions during heat setting. This tensioning system with heat-setting parameters allows the cloth to have controlled shrinkage. An example tensioning system includes a rectangular base with a threaded rod extending between opposing sides of the base. Pin racks 1104 are mounted to the threaded rods. Each of the pin racks 1104 includes at least one pin that couples to/engages the cloth. The cloth is mounted on each of the pin racks 1104, and a tensioning knob 1102 is used to control the tension on the cloth by moving the pin racks 1104 along the threaded rods. For example, moving the pin racks 1104 outwards/towards the sides of the base will increase tension, stretching the cloth. Whereas moving the pin racks 1104 inwards releases the tension, relaxing the cloth.

In still further aspects, any of the described above textiles can be produced by the disclosed herein methods.

The present disclosure also provides for a method of making an implantable medical device comprising: providing a sealing element comprising a textile material defined by a first surface and an opposite second surface and having a longitudinal axis and a transverse axis, and having a first thickness, a first width, and a first length, and comprising: a plurality of weft yarns and a plurality of warp yarns arranged such that at least a portion of the first surface and/or the second surface of the textile has a 3-D honeycomb pattern having a plurality of repeating cell unit, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversible arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response; and securing the sealing element to an annular frame of the implantable medical device.

In still further aspects, any of the implantable medical devices disclosed herein can be formed by such methods. In still further aspects, any of the disclosed herein textiles can be used to form the sealing element of the device. In still further aspects, any methods commonly used to secure the sealing element to an annular frame can be used, for example, and without limitation, the sealing element can be secured to the annular frame of the device with a suture. Any known in the art sutures can be used. In some exemplary and unlimiting aspects, the sutures can comprise textile-based materials. However, it is understood that any sutures that applicable to the desired applications can be utilized.

Also disclosed herein are methods making an implantable medical device comprising: providing a self-expanding frame having an upper region, an intermediate region and a lower region, wherein the frame is configured to radially expand and contract for deployment within a body cavity, and wherein the self-expanding frame comprises a plurality of anchoring members disposed along the lower region; enclosing at least a portion of at least some of the plurality of anchoring members within a textile material, wherein the textile material is defined by a first surface and an opposite second surface having a longitudinal axis and a transverse axis, and having a first thickness, a first width, and a first length and comprises: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile exhibits a first stress-relaxation response; and the textile exhibits compressibility of 50-95% of the first thickness under a loading force of about 45 to about 56 lbs. It is understood that in some aspects described herein, the step of enclosing can comprise forming one or more layers of the textile material around the at least a portion of at least some of the plurality of anchoring members.

It is understood that any of the implantable medical devices disclosed herein can be made by these methods. It is further understood that any of the disclosed textiles can be used to enclose the at least a portion of at least one yarn of the plurality of anchoring members. In still further aspects, the step of enclosing can comprise forming one or more layers of the textile material around the at least a portion of at least some of the plurality of anchoring members. It is further understood that in some aspects, the step of forming one or more layers can comprise forming these layers by wrapping the at least a portion of at least one yarn of the plurality of anchoring members with the textile. Yet, in other aspects, the step of forming one or more layers can comprise enclosing the at least a portion of at least one yarn of the plurality of anchoring members with separate layers of the textile.

In still further aspects, the methods disclosed herein can comprise a step of impregnating any of the disclosed herein textile materials with a pharmaceutically active agent depending on the desired application. In still further aspects, the methods disclosed herein can comprise a step of coating any of the disclosed herein textile materials with any known in the art materials that can provide for any additional desired properties.

EXAMPLES

The following examples are put forth so as to provide those of ordinary skill in the art with a complete disclosure and description of how the compounds, compositions, articles, devices and/or methods claimed herein are made and evaluated and are intended to be purely exemplary and are not intended to limit the disclosure. Efforts have been made to ensure accuracy with respect to numbers (e.g., amounts, temperature, etc.), but some errors and deviations should be accounted for.

Unless indicated otherwise, parts are parts by weight, temperature is degrees C. or is at ambient temperature, and pressure is at or near atmospheric or full vacuum.

Figure 2:
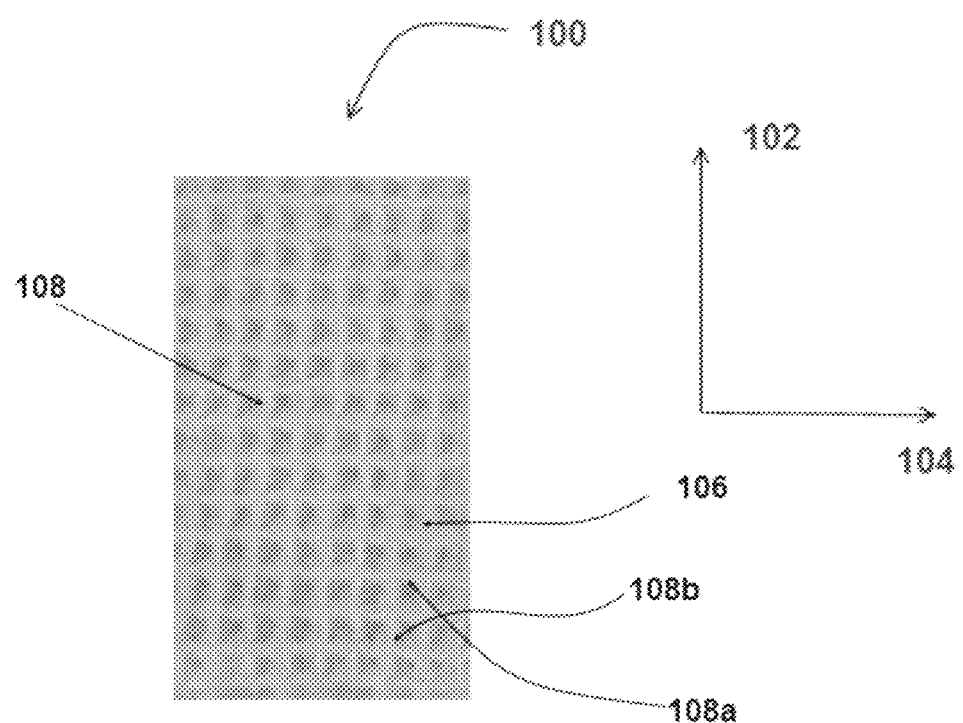
FIG. 2 shows an exemplary textile having a 3-D honeycomb pattern having a plurality of repeating cell units after heat-set conditions at 90° C. for 10 min.
Figure 3:
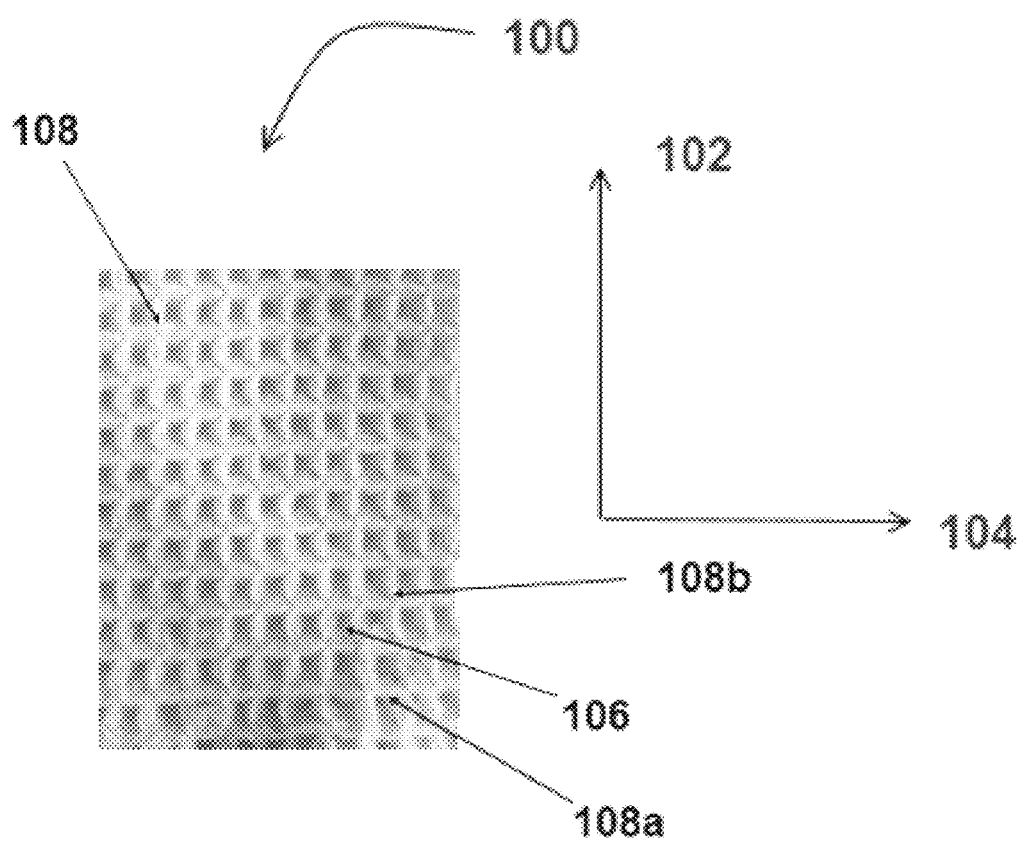
FIG. 3 shows an exemplary textile having a 3-D honeycomb pattern having a plurality of repeating cell units after heat-set conditions at 120° C. for 10 min.
Figure 4:
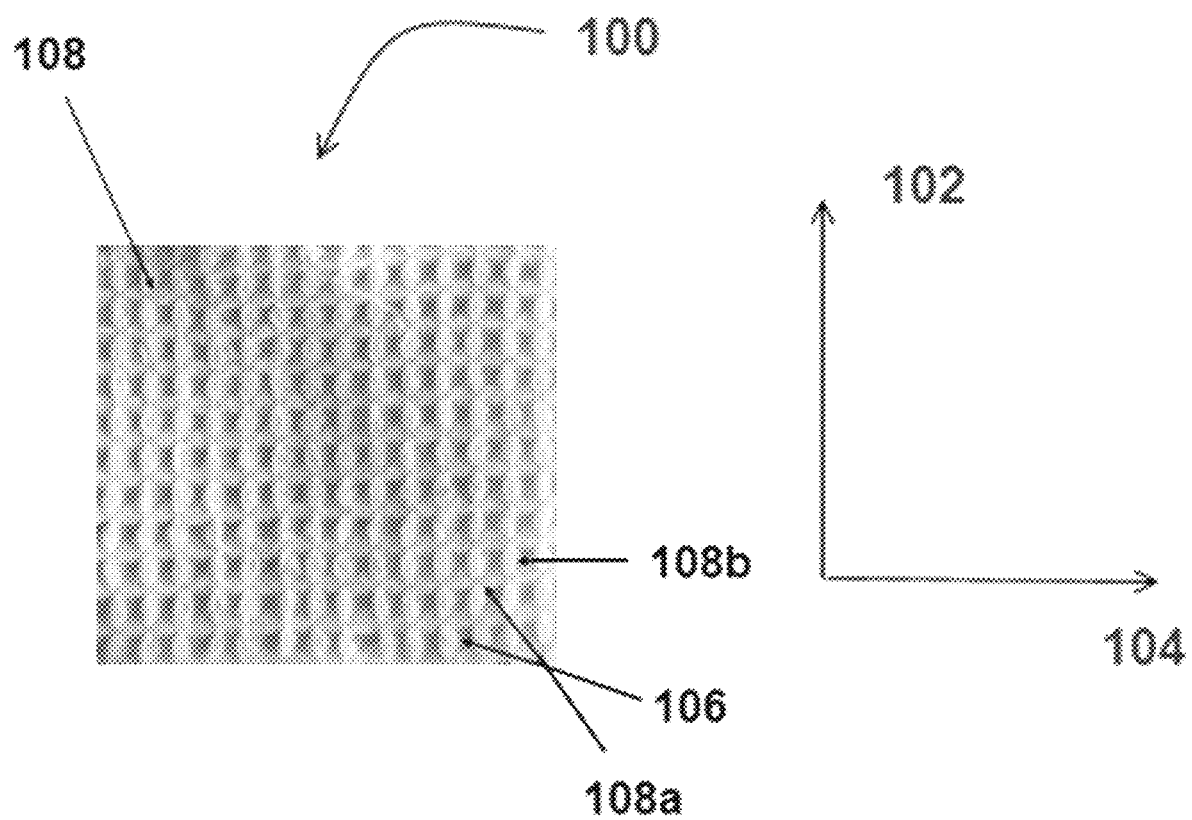
FIG. 4 shows an exemplary textile having a 3-D honeycomb pattern having a plurality of repeating cell units after heat-set conditions at 180° C. for 10 min.

A textile 100 having a longitudinal axis 102 (y-axis) and a transverse axis 104 (x-axis), as shown in FIG. 1, for example, was constructed on a weaving machine. The textile construction uses 16 pick repeat honeycomb weave using 40 denier/27 filament textured yarn in warp and weft direction. As described above, in some exemplary aspects, the weave pattern forms a repeated pattern of inverted and raised space on both surfaces of the textile 100. As illustrated in FIGS. 1-4, the honeycomb weave results in a repeating pattern of cells 106 and ridges 108, shown here on one side of the textile 100. The cells 106 are bounded between adjacent longitudinal and transverse extending ridges 108. As provided in FIGS. 1-4, the ridges 108a extend substantially parallel with the longitudinal axis 102 of the textile 100 and ridges 108b extend substantially parallel with the transverse axis 104 of the textile 100. The spacing between the longitudinal ridges 108a and the transverse ridges 108b is determined generally based on the pick repeat of the pattern (i.e., the number of cells 106 per square inch of the honeycomb pattern). As illustrated in FIGS. 1-4, the longitudinal ridges 108a and the transverse ridges 108b can be equally spaced along the width and length of the textile 100, respectively. Though not illustrated, other weave patterns are contemplated that to vary the spacing between the longitudinal and transverse ridges 108a, 108b. For example, the transverse ridges 108b may have an increased spacing compared to the spacing of the longitudinal ridges 108a, and vice versa. Likewise, the spacing between adjacent longitudinal and the transverse ridges 108b, 108a may vary along the length and width of the textile. Similarly, other weave patterns are contemplated to vary the orientations/angles of the longitudinal and transverse ridges 108a, 108b (with respect to the longitudinal and transverse axis 102, 104, respectively). For example, the longitudinal ridges 108a can be oriented at an angle with respect to the longitudinal axis 102 and/or the transverse ridges 108b can be oriented at an angle with respect to the transverse axis 104 of the textile. FIGS. 1-4 illustrate the ridges 108 defining square/rectilinear-shaped cells 106. Based on changes in the spacing and/or orientation of the longitudinal and transverse ridges 108a, 108b in the weave pattern, different shaped cells 106 can be formed (e.g., rectangular, diamond). As described above, the honeycomb weave forms in some aspects a 3-D honeycomb pattern forms an inverted space on both surfaces of the textile 100. That is, in such exemplary aspects, on each side of the textile, at least a portion of cells 106 extends in a direction away from the ridges 108 (e.g., extend in a direction along a z-axis of the textile 100 (perpendicular to both the longitudinal axis 102 and the transverse axis 104). FIGS. 2-4 show the same textile exposed to different heat-setting conditions. In FIG. 2, the textile has been exposed to 90° C. for 10 min, while in FIG. 3, the textile has been exposed to 120° C. for 10 min, and in FIGS. 4 to 180° C. for 10 min. Temperature and heat exposure time increases result in a corresponding increase in at least one yarn of the thickness, compressibility and stretchability of the textile. For example, a higher temperature and time combination results in higher thickness, compressibility and stretchability. However, the increase in each of these properties is limited by the available spaces between yarns, which correlates to the density of yarns in the cloth.

Exemplary Aspects

In view of the described processes and compositions, hereinbelow are described certain more particularly described aspects of the disclosures. These particularly recited aspects should not, however, be interpreted to have any limiting effect on any different claims containing different or more general teachings described herein, or that the "particular" aspects are somehow limited in some way other than the inherent meanings of the language and formulas literally used therein.

Example 1

A textile defined by a first surface and an opposite second surface, having a longitudinal axis and a transverse axis, and having a first thickness, a first width, and a first length, and comprising: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversible arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response.

Example 2

The textile of any examples herein, particularly example 1, when the stress comprises stretching the textile in one or more directions along the longitudinal, the transverse axis, or across of the textile, the second dimension selected from the second length or width is greater than 0 to about 300% of the first dimension selected from the first length or width, as measured in a stretch direction.

Example 3

The textile of any examples herein, particularly example 2, wherein the second dimension along each direction is the same or different from the second dimension along the rest of the one or more directions.

Example 4

The textile of any examples herein, particularly examples 1-3, when the stress comprises compression across the first thickness of the textile, the textile exhibits compressibility of 50-95% of the first thickness under a loading force of from about 45 to about 56 lbs.

Example 5

The textile of any examples herein, particularly examples 1-4, wherein the at least a portion of the first surface and the second surface has the 3-D honeycomb pattern.

Example 6

The textile of any examples herein, particularly examples 1-5, wherein the plurality of warp yarn and the plurality of weft yarns comprise the textured yarn.

Example 7

The textile of any examples herein, particularly examples 1-6, wherein the textured yarn is selected from a friction-textured yarn, a pin textured yarn, an air textured yarn, a belt textured yarn, a stuffer box textured yarn, or any combination thereof.

Example 8

The textile of any examples herein, particularly examples 1-7, wherein the textured yarn is a friction-textured yarn.

Example 9

The textile of any examples herein, particularly examples 1-8, wherein each yarn of the plurality of weft yarns and/or warp yarns comprises a plurality of fibers.

Example 10

The textile of any examples herein, particularly examples 1-9, wherein the textured yarn comprises polyesters, co-polyesters, ultra-high molecular weight polyethylene, polyethylene, polypropylene, polytetrafluoroethylene, expanded polytetrafluoroethylene, polyvinylidene fluoride, polyurethane, polyethers, polyureas, nylon, copolymers thereof, or a combination thereof.

Example 11

The textile of any examples herein, particularly examples 1-10, wherein each yarn of the plurality of weft yarns and/or warp yarns has a size from about 10 to about 200 denier.

Example 12

The textile of any examples herein, particularly examples 9-11, wherein each yarn of the plurality of weft yarns and/or warp yarns comprises from about 8 to about 150 fibers.

Example 13

The textile of any examples herein, particularly examples 9-12, wherein the fibers have a diameter from about 1 µm to about 25 µm.

Example 14

The textile of any examples herein, particularly examples 1-13, wherein the textured yarn has a second stress-relaxation response.

Example 15

The textile of any examples herein, particularly example 14, wherein the first stress-relaxation response is defined by first heat-set conditions of the textile and the second stress-relaxation response.

Example 16

The textile of any examples herein, particularly example 14 or 15, wherein the second stress-relaxation response is defined by second heat-set conditions of the textured yarn.

Example 17

The textile of any examples herein, particularly example 15 or 16, wherein the first and/or second heat-set conditions comprise a heat-set temperature from about 90° C. to about 220° C.

Example 18

The textile of any examples herein, particularly examples 15-17, wherein the first and/or second heat set conditions comprise a heat setting time from about 2 min to about 1.

Example 19

The textile of any examples herein, particularly examples 15-18, wherein the first heat set-set conditions are the same or different than the second heat-conditions.

Example 20

The textile of any examples herein, particularly examples 1-19, wherein the plurality of warp yarns and/or the plurality of weft yarns further comprises at least one yarn selected from polyolefins, polyamides, polyesters, co-polyesters, polyurethanes, natural fibers, polytetrafluoroethylene, polyvinylidene fluoride, polyethers, polyureas, copolymers thereof, or a combination thereof.

Example 21

The textile of any examples herein, particularly example 20, wherein the at least one yarn comprises a composite fiber.

Example 22

The textile of any examples herein, particularly examples 1-21, wherein the textile comprises a first edge and an opposite second edge.

Example 23

The textile of any examples herein, particularly example 22, wherein at least a portion of the textile adjacent to the first and/or second edge comprises a plain weave, a twill weave, a satin weave, any derivative, or any combination thereof.

Example 24

The textile of any examples herein, particularly examples 1-23, wherein the plurality of repeating cell units comprise from about 1 to about 30 cells per inch.

Example 25

The textile of any examples herein, particularly examples 1-24, wherein each of the plurality of repeating cell units comprises from about 8 to 40 pick repeats.

Example 26

The textile of any examples herein, particularly examples 1-25, wherein the textile is configured to be sutured.

Example 27

A tissue scaffold material comprising the textile of any examples herein, particularly examples 1-26.

Example 28

An implantable medical device comprising: an annular frame having an inflow end, an outflow end, and a longitudinal axis; and a sealing element secured to the frame, wherein the sealing element comprises: a textile defined by a first surface and an opposite second surface, having a longitudinal axis and a transverse axis, and having a first thickness, a first width, and a first length, and comprising: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversible arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response; and wherein the implantable medical device is configured to radially collapse to a collapsed configuration and radially expand to an expanded configuration.

Example 29

The implantable medical device of any examples herein, particularly example 28, when the stress comprises stretching the textile in one or more directions along the longitudinal, the transverse axis, or across of the textile, the second dimension selected from the second length or width is greater than 0 to about 300% of the first dimension selected from the first length or width, as measured in the stretch direction.

Example 30

The implantable medical device of any examples herein, particularly example 29, wherein the second dimension along each direction is the same or different from the second dimension along the rest of the one or more directions.

Example 31

The implantable medical device of any examples herein, particularly examples 28-30, when the stress comprises compression across the first thickness of the textile, the textile exhibits compressibility of 50-95% of the first thickness under a loading force of from about 45 to about 56 lbs.

Example 32

The implantable medical device of any examples herein, particularly examples 28-31, wherein the stress comprises expansion of the medical device to arrive at the expanded configuration.

Example 33

The implantable medical device of any examples herein, particularly examples 28-32, wherein the at least a portion of the first surface and the second surface has the 3-D honeycomb pattern.

Example 34

The implantable medical device of any examples herein, particularly examples 28-33, wherein the plurality of warp yarn and the plurality of weft yarns comprise the textured yarn.

Example 35

The implantable medical device of any examples herein, particularly examples 28-34, wherein the textured yarn is selected from a friction-textured yarn, a pin textured yarn, an air textured yarn, a belt textured yarn, a stuffer box textured yarn, or any combination thereof.

Example 36

The implantable medical device of any examples herein, particularly examples 28-35, wherein the textured yarn is a friction-textured yarn.

Example 37

The implantable medical device of any examples herein, particularly examples 28-36, wherein each yarn of the plurality of weft yarns and/or warp yarns comprises a plurality of fibers.

Example 38

The implantable medical device of any examples herein, particularly examples 28-37, wherein the textured yarn comprises polyesters, co-polyesters, ultra-high molecular weight polyethylene, polyethylene, polypropylene, polytetrafluoroethylene, expanded polytetrafluorethylene, polyvinylidene fluoride, polyurethane, polyethers, polyureas, nylon, copolymers thereof, or a combination thereof.

Example 39

The implantable medical device of any examples herein, particularly examples 28-38, wherein each yarn of the plurality of weft yarns and/or warp yarns has a size from about 10 to about 200 denier.

Example 40

The implantable medical device of any examples herein, particularly examples 37-39, wherein each yarn the plurality of weft yarns and/or warp yarns comprises from about 8 to about 150 fibers.

Example 41

The implantable medical device of any examples herein, particularly examples 37-40, wherein the fibers have a diameter from about 1 µm to about 25 µm.

Example 42

The implantable medical device of any examples herein, particularly examples 27-41, wherein the textured yarn has a second stress-relaxation response.

Example 43

The implantable medical device of any examples herein, particularly examples 27-42, wherein the first stress-relaxation response is defined by first heat-set conditions of the textile and the second stress-relaxation response.

Example 44

The implantable medical device of any examples herein, particularly example 43 or 44, the second stress-relaxation response is defined by second heat-set conditions of the textured yarn.

Example 45

The implantable medical device of any examples herein, particularly example 43 or 44, wherein the first and/or second heat-set conditions comprise a heat-set temperature from about 90° C. to about 220° C.

Example 46

The implantable medical device any examples herein, particularly examples 43-45, wherein the first and/or second heat set conditions comprise a heat setting time from about 2 min to about 1 h.

Example 47

The implantable medical device any examples herein, particularly examples 43-46, wherein the first heat set-set conditions are the same or different than the second heat-conditions.

Example 48

The implantable medical device of any examples herein, particularly examples 28-47, wherein the plurality of warp yarns and/or the plurality of weft yarns further comprises at least one yarn selected from polyolefins, polyamides, polyesters, co-polyesters, polyurethanes, natural fibers, polytetrafluorethylene, polyvinylidene fluoride, polyethers, polyureas, copolymers thereof, or a combination thereof.

Example 49

The implantable medical device of any examples herein, particularly example 48, wherein the at least one yarn comprises a composite fiber.

Example 50

The implantable medical device of any examples herein, particularly examples 28-49, wherein the textile comprises a first edge and an opposite second edge.

Example 51

The implantable medical device of any examples herein, particularly example 50, wherein at least a portion of the textile adjacent to the first and/or second edge comprises a plain weave, a twill weave, a satin weave, any derivative, or any combination thereof.

Example 52

The implantable medical device of any examples herein, particularly examples 28-51, wherein the plurality of repeating cell units comprises from about 1 to about 30 cells per inch.

Example 53

The implantable medical device of any examples herein, particularly examples 28-52, wherein each of the plurality of repeating cell units comprises from about 8 to 40 pick repeats.

Example 54

The implantable medical device of any examples herein, particularly examples 28-53, wherein the textile is coupled with the frame by a suture.

Example 55

The implantable medical device of any examples herein, particularly examples 28-54, wherein the medical device is a prosthetic heart valve.

Example 56

The implantable medical device of any examples herein, particularly examples 28-55, wherein the sealing element is configured to prevent a paravalvular leak.

Example 57

An implantable medical device comprising: a self-expanding frame having an upper region, an intermediate region and a lower region, wherein the frame is configured to radially expand and contract for deployment within a body cavity, and wherein the self-expanding frame comprises a plurality of anchoring members disposed along the lower region; wherein at least a portion of at least some of the plurality of anchoring members is enclosed within a textile material, wherein the textile material is defined by a first surface and an opposite second surface, having a longitudinal axis and a transverse axis, and having a first thickness, a first width, and a first lengths, and comprising: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile exhibits a first stress-relaxation response; and wherein the textile material is biocompatible and behaves as a cushion, and exhibits compressibility of 50-95% of the first thickness under a loading force of from about 45 to about 56 lbs.

Example 58

The implantable medical device of any examples herein, particularly example 57, wherein the self-expanding frame comprises one or more struts, and wherein at least a portion of the one or more struts is enclosed within the textile material.

Example 59

The implantable medical device of any examples herein, particularly examples 57-58, wherein the textile material is configured to behave as a tissue scaffold.

Example 60

The implantable medical device of any examples herein, particularly examples 57-59, wherein the textile material is defined by a first dimension selected from the first textile thickness, the first textile width, or the first textile length.

Example 61

The implantable medical device of any examples herein, particularly examples 57-60, wherein the at least a portion of the first surface and the second surface of the textile has the 3-D honeycomb pattern.

Example 62

The implantable medical device of any examples herein, particularly examples 57-61, wherein the plurality of warp yarn and the plurality of weft yarns of the textile material comprise the textured yarn.

Example 63

The implantable medical device of any examples herein, particularly examples 57-62, wherein the textured yarn is selected from a friction-textured yarn, a pin textured yarn, an air textured yarn, a belt textured yarn, a stuffer box textured yarn, or any combination thereof.

Example 64

The implantable medical device of any examples herein, particularly examples 57-63, wherein the textured yarn is a friction-textured yarn.

Example 65

The implantable medical device of any examples herein, particularly examples 57-64, wherein each yarn of the plurality of weft yarns and/or warp yarns of the textile material comprises a plurality of fibers.

Example 66

The implantable medical device of any examples herein, particularly examples 57-65, wherein the textured yarn comprises polyesters, co-polyesters, ultra-high molecular weight polyethylene, polyethylene, polypropylene, polytetrafluoroethylene, expanded polytetrafluoroethylene, polyvinylidene fluoride, polyurethane, polyethers, polyureas, nylon, copolymers thereof, or a combination thereof.

Example 67

The implantable medical device of any examples herein, particularly examples 57-66, wherein each yarn of the plurality of weft yarns and/or warp yarns has a size from about 10 to about 200 denier.

Example 68

The implantable medical device of any examples herein, particularly examples 65-67, wherein each yarn the plurality of weft yarns and/or warp yarns comprises from about 8 to about 150 fibers.

Example 69

The implantable medical device of any examples herein, particularly examples 65-68, wherein the fibers have a diameter from about 1 μm to about 25 μm.

Example 70

The implantable medical device of any examples herein, particularly examples 57-69, wherein the textured yarn has a second stress-relaxation response.

Example 71

The implantable medical device of any examples herein, particularly examples 57-70, wherein the first stress-relaxation response is defined by first heat-set conditions of the textile and the second stress-relaxation response.

Example 72

The implantable medical device of any examples herein, particularly example 70 or 71, wherein the second stress-relaxation response is defined by second heat-set conditions of the textured yarn.

Example 73

The implantable medical device of any examples herein, particularly example 71 or 72, wherein the first and/or second heat-set conditions comprise a heat-set temperature from about 90° C. to about 220° C.

Example 74

The implantable medical device of any examples herein, particularly example 71-73, wherein the first and/or second heat set conditions comprise a heat setting time from about 2 min to about 1 h.

Example 75

The implantable medical device any examples herein, particularly examples 71-74, wherein the first heat set-set conditions are the same or different than the second heat-conditions.

Example 76

The implantable medical device of any examples herein, particularly examples 57-75, wherein the plurality of warp yarns and/or the plurality of weft yarns further comprises at least one yarn selected from polyolefins, polyamides, polyesters, co-polyesters, polyurethanes, natural fibers, polytetrafluoroethylene, polyvinylidene fluoride, polyethers, polyureas, copolymers thereof, or a combination thereof.

Example 77

The implantable medical device of any examples herein, particularly example 76, wherein the at least one yarn comprises a composite fiber.

Example 78

The implantable medical device of any examples herein, particularly examples 57-77, wherein the textile comprises a first edge and an opposite second edge.

Example 79

The implantable medical device of any examples herein, particularly example 78, wherein at least a portion of the textile adjacent to the first and/or second edge comprises a plain weave, a twill weave, a satin weave, any derivative, or any combination thereof.

Example 80

The implantable medical device of any examples herein, particularly examples 57-79, wherein the plurality of repeating cell units comprises from about 1 to about 30 cells per inch.

Example 81

The implantable medical device of any examples herein, particularly examples 57-80, wherein each of the plurality of repeating cell units comprises from about 8 to 40 pick repeats.

Example 82

The implantable medical device of any examples herein, particularly examples 57-81, wherein the textile material is stitchable with a suture.

Example 83

The implantable medical device of any examples herein, particularly examples 57-82, wherein the enclosure of the at least a portion of at least some of the plurality of anchoring members are formed by one or more layers of the textile material.

Example 84

The implantable medical device of any examples herein, particularly examples 57-83, wherein the medical device is a prosthetic mitral valve.

Example 85

A method comprising: weaving a plurality of weft yarns and a plurality of warp yarns to form a textile, wherein the formed textile is defined by a first surface and an opposite second surface and having a longitudinal axis and a transverse axis, and having a first thickness, a first width, and a first lengths and wherein at least a portion of the first surface and/or the second surface has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversible arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response.

Example 86

The method of any examples herein, particularly example 85, wherein the method comprises exposing the textile to conditions effective to obtain the first stress-relaxation response.

Example 87

The method of any examples herein, particularly example 86, wherein the conditions effective to obtain the first stress-relaxation response comprise heat-setting the textile at a predetermined temperature and time.

Example 88

The method of any examples herein, particularly examples 85-86, wherein the formed textile is any examples herein, particularly examples 1-26.

Example 89

A method of making an implantable medical device comprising: providing a sealing element comprising a textile material defined by a first surface and an opposite second surface and having a longitudinal axis and a transverse axis, and having a first thickness, a first width, and a first length, and comprising: a plurality of weft yarns and a plurality of warp yarns arranged such that at least a portion of the first surface and/or the second surface of the textile has a 3-D honeycomb pattern having a plurality of repeating cell unit, wherein at least one yarn of the plurality of warp yarns and/or the plurality of weft yarns is a textured yarn exhibiting a heat-shrinkage rate from about 10% to about 60%; wherein the textile has a first dimension in a relaxed position along the longitudinal axis, the transverse axis, and across of the textile, wherein the first dimension is defined by the first thickness, the first width, or the first length, and wherein the textile is configured to reversible arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response; securing the sealing element to an annular frame of the implantable medical device.

Example 90

A method of making an implantable medical device comprising: providing a self-expanding frame having an upper region, an intermediate region and a lower region, wherein the frame is configured to radially expand and contract for deployment within a body cavity, and wherein the self-expanding frame comprises a plurality of anchoring members disposed along the lower region; enclosing at least a portion of at least some of the plurality of anchoring members within a textile material, wherein the textile material is defined by a first surface and an opposite second surface having a longitudinal axis and a transverse axis, and having a first thickness, a first width, and a first length and comprises: a plurality of weft yarns and a plurality of warp yarns arranged such that at least a portion of the first surface and/or the second surface of the textile has a 3-D honeycomb pattern having a plurality of repeating cell units, wherein at least one yarn of the plurality of warp yarns and/or the plurality of weft yarns is a textured yarn exhibiting a heat-shrinkage rate from about 10% to about 60%; wherein the textile exhibits a first stress-relaxation response; and wherein the textile material is biocompatible and behaves as a cushion, and exhibits compressibility of 50-95% of the first thickness under a loading force of from about 45 to about 56 lbs.

Example 91

The method of any examples herein, particularly example 90, wherein the step of enclosing comprises forming one or more layers of the textile material around the at least a portion of at least some of the plurality of anchoring members.

Although several aspects of the disclosure have been disclosed in the foregoing specification, it is understood by those skilled in the art that many modifications and other aspects of the disclosure will come to mind to which the disclosure pertains, having the benefit of the teaching presented in the foregoing description and associated drawings. Thus, it is understood that the disclosure is not limited to the specific aspects disclosed hereinabove and that many modifications and other aspects are intended to be included within the scope of the appended claims. Moreover, although specific terms are employed herein, as well as in the claims which follow, they are used only in a generic and descriptive sense and not for the purposes of limiting the described disclosure nor the claims which follow. Therefore, we claim as our disclosure all that comes within the scope and spirit of these claims.

We claim:

1. A textile defined by a first surface and an opposite second surface, having a longitudinal axis and a transverse axis, and having a first thickness, a first width, and a first length, and comprising:
  a plurality of weft yarns and a plurality of warp yarns arranged such that at least a portion of the first surface and/or the second surface of the textile has a 3-D honeycomb pattern having a plurality of repeating cell units,
  wherein at least one yarn of the plurality of warp yarns and/or the plurality of weft yarns is a textured yarn exhibiting a heat-shrinkage rate from about 10% to about 60%;
  wherein the textile has a first dimension in a relaxed position along the longitudinal axis, the transverse axis, and across of the textile, wherein the first dimension is defined by the first thickness, the first width, or the first length, and wherein the textile is configured to reversibly arrive at a second dimension under application of stress, wherein the second dimension is defined by a second thickness, a second width, or a second length, and return to the first dimension upon removal of stress, wherein the textile is bio-compatible; and wherein the textile exhibits a first stress-relaxation response.

2. The textile of claim 1, when the stress comprises stretching the textile in one or more directions along the longitudinal, the transverse axis, or across of the textile, the second dimension selected from the second length or width is greater than 0 to about 300% of the first dimension selected from the first length or width, as measured in a stretch direction.

3. The textile of claim 1, when the stress comprises compression across the first thickness of the textile, the textile exhibits compressibility of 50-95% of the first thickness under a loading force of from about 45 to about 56 lbs.

4. The textile of claim 1, wherein each yarn of the plurality of weft yarns and/or warp yarns has a size from about 10 to about 200 denier.

5. The textile of claim 1, wherein the textured yarn has a second stress-relaxation response.

6. The textile of claim 5, wherein the first stress-relaxation response is defined by first heat-set conditions of the textile and the second stress-relaxation response, wherein the second stress-relaxation response is defined by second heat-set conditions of the textured yarn.

7. The textile of claim 6, wherein the first and/or second heat-set conditions comprise a heat-set temperature from about 90° C. to about 220° C.

8. The textile of claim 7, wherein the first and/or second heat set conditions comprise a heat setting time from about 2 min to about 1 h.

9. The textile of claim 1, wherein the plurality of repeating cell units comprise from about 1 to about 30 cells per inch.

10. The textile of claim 1, wherein each of the plurality of repeating cell units comprises from about 8 to 40 pick repeats.

11. A tissue scaffold material comprising the textile of claim 1.

12. An implantable medical device comprising:
an annular frame having an inflow end, an outflow end, and a longitudinal axis; and
a sealing element secured to the frame, wherein the sealing element comprises: a textile defined by a first surface and an opposite second surface, having a longitudinal axis and a transverse axis, and having a first thickness, a first width, and a first length, and comprising:
a plurality of weft yarns and a plurality of warp yarns arranged such that at least a portion of the first surface and/or the second surface of the textile has a 3-D honeycomb pattern having a plurality of repeating cell units,
wherein at least one yarn of the plurality of warp yarns and/or the plurality of weft yarns is a textured yarn exhibiting a heat-shrinkage rate from about 10% to about 60%;
wherein the textile has a first dimension in a relaxed position along the longitudinal axis, the transverse axis, and across of the textile, wherein the first dimension is defined by the first thickness, the first width, or the first length, and wherein the textile is configured to reversibly arrive at a second dimension under application of stress, wherein the second dimension is defined by a second thickness, a second width, and/or a second length, and return to the first dimension upon removal of stress, wherein the textile is bio-compatible; and wherein the textile exhibits a first stress-relaxation response; and
wherein the implantable medical device is configured to radially collapse to a collapsed configuration and radially expand to an expanded configuration.

13. An implantable medical device comprising:
a frame having an upper region, an intermediate region and a lower region, wherein the frame is configured to radially expand and contract for deployment within a body cavity, and wherein the frame comprises a plurality of anchoring members disposed along the lower region;
wherein at least a portion of at least some of the plurality of anchoring members is enclosed within a textile material, wherein the textile material is defined by a first surface and an opposite second surface, having a longitudinal axis and a transverse axis, and having a first thickness, a first width, and a first length, and comprising:
a plurality of weft yarns and a plurality of warp yarns arranged such that at least a portion of the first surface and/or the second surface of the textile has a 3-D honeycomb pattern having a plurality of repeating cell units,
wherein at least one yarn of the plurality of warp yarns and/or the plurality of weft yarns is a textured yarn exhibiting a heat-shrinkage rate from about 10% to about 60%;
wherein the textile exhibits a first stress-relaxation response; and
wherein the textile material is biocompatible and behaves as a cushion, and exhibits compressibility of 50-95% of the first thickness under a loading force of from about 45 to about 56 lbs.

14. The implantable medical device of claim 13, wherein the frame comprises one or more struts, and wherein at least a portion of the one or more struts is enclosed within the textile material.

15. The implantable medical device of claim 13, wherein the first stress-relaxation response is defined by first heat-set conditions of the textile.

16. A method comprising:
weaving a plurality of weft yarns and a plurality of warp yarns to form a textile, wherein the formed textile is defined by a first surface and an opposite second surface and having a longitudinal axis and a transverse axis, and having a first thickness, a first width, and a first length and wherein at least a portion of the first surface and/or the second surface has a 3-D honeycomb pattern having a plurality of repeating cell units,
wherein at least one yarn of the plurality of warp yarns and/or the plurality of weft yarns is a textured yarn exhibiting a heat-shrinkage rate from about 10% to about 60%;
wherein the textile has a first dimension in a relaxed position along the longitudinal axis, the transverse axis, and across of the textile, wherein the first dimension is defined by the first thickness, the first width, or the first length, and wherein the textile is configured to reversibly arrive at a second dimension under application of stress, wherein the second dimension is defined by a second thickness, a second width, or a second length, and return to the first dimension upon removal of stress and wherein the textile is bio-compatible; and wherein the textile exhibits a first stress-relaxation response.

17. The method of claim 16, wherein the method comprises exposing the textile to conditions effective to obtain the first stress-relaxation response.

18. The method of claim 17, wherein the conditions effective to obtain the first stress-relaxation response comprise heat-setting the textile at a predetermined temperature and time.

19. A method of making an implantable medical device comprising:
- providing a sealing element comprising a textile material defined by a first surface and an opposite second surface and having a longitudinal axis and a transverse axis, and having a first thickness, a first width, and a first length, and comprising:
  - a plurality of weft yarns and a plurality of warp yarns arranged such that at least a portion of the first surface and/or the second surface of the textile has a 3-D honeycomb pattern having a plurality of repeating cell unit,
  - wherein at least one yarn of the plurality of warp yarns and/or the plurality of weft yarns is a textured yarn exhibiting a heat-shrinkage rate from about 10% to about 60%;
  - wherein the textile has a first dimension in a relaxed position along the longitudinal axis, the transverse axis, and across of the textile, wherein the first dimension is defined by the first thickness, the first width, or the first length, and wherein the textile is configured to reversibly arrive at a second dimension under application of stress, wherein the second dimension is defined by a second thickness, a second width, or a second length, and return to the first dimension upon removal of stress and wherein the textile is bio-compatible; and
- wherein the textile exhibits a first stress-relaxation response;
- securing the sealing element to an annular frame of the implantable medical device.

20. A method of making an implantable medical device comprising:
- providing a self-expanding frame having an upper region, an intermediate region and a lower region, wherein the frame is configured to radially expand and contract for deployment within a body cavity, and wherein the self-expanding frame comprises a plurality of anchoring members disposed along the lower region;
- enclosing at least a portion of at least some of the plurality of anchoring members within a textile material, wherein the textile material is defined by a first surface and an opposite second surface having a longitudinal axis and a transverse axis, and having a first thickness, a first width, and a first length and comprises:
  - a plurality of weft yarns and a plurality of warp yarns arranged such that at least a portion of the first surface and/or the second surface of the textile has a 3-D honeycomb pattern having a plurality of repeating cell units,
  - wherein at least one yarn of the plurality of warp yarns and/or the plurality of weft yarns is a textured yarn exhibiting a heat-shrinkage rate from about 10% to about 60%;
- wherein the textile exhibits a first stress-relaxation response; and
- wherein the textile material is biocompatible and behaves as a cushion, and exhibits compressibility of 50-95% of the first thickness under a loading force of from about 45 to about 56 lbs.

* * * * *